US012417498B2

(12) United States Patent
Zheltikov

(10) Patent No.: US 12,417,498 B2
(45) Date of Patent: Sep. 16, 2025

(54) METHODS FOR SELECTING ASSETS SUITABLE FOR TRADING CONSIDERATION AND VISUAL PRESENTATIONS THEREOF

(71) Applicant: Kirill Zheltikov, Riga (LV)

(72) Inventor: Kirill Zheltikov, Riga (LV)

( * ) Notice: Subject to any disclaimer, the term of this patent is extended or adjusted under 35 U.S.C. 154(b) by 42 days.

(21) Appl. No.: 18/211,876

(22) Filed: Jun. 20, 2023

(65) Prior Publication Data

US 2024/0127337 A1    Apr. 18, 2024

Related U.S. Application Data

(60) Provisional application No. 63/452,104, filed on Mar. 14, 2023, provisional application No. 63/416,466, filed on Oct. 14, 2022.

(51) Int. Cl.
*G06Q 40/00* (2023.01)
*G06Q 40/04* (2012.01)

(52) U.S. Cl.
CPC .................... *G06Q 40/04* (2013.01)

(58) Field of Classification Search
CPC .............. G06Q 40/04; G06Q 40/06
USPC ........................................ 705/3–44
See application file for complete search history.

(56) References Cited

U.S. PATENT DOCUMENTS

| | | | | |
|---|---|---|---|---|
| 8,015,097 B2 * | 9/2011 | Lawrence | .............. | G06Q 40/06 705/37 |
| 10,438,285 B1 * | 10/2019 | Konstantinides | ...... | G06Q 30/08 |
| 11,522,700 B1 * | 12/2022 | Auerbach | ............. | H04L 9/3213 |
| 11,526,524 B1 * | 12/2022 | Saulys | ....... | G06F 8/34 |
| 2004/0133500 A1 * | 7/2004 | Thompson | ............. | G06Q 40/04 705/37 |
| 2007/0050273 A1 * | 3/2007 | Burke | .................... | G06Q 40/02 705/35 |
| 2008/0109383 A1 * | 5/2008 | Jaffe | ...................... | G06Q 40/06 705/36 R |
| 2009/0018897 A1 * | 1/2009 | Breiter | .................. | G06Q 10/00 705/7.32 |
| 2009/0125370 A1 * | 5/2009 | Blondeau | ........... | G06Q 10/0633 706/12 |
| 2015/0332224 A1 * | 11/2015 | Melika | ............... | G06Q 20/0658 705/41 |
| 2016/0299973 A1 * | 10/2016 | Oakeson | ............. | G06F 16/9535 |
| 2017/0301015 A1 * | 10/2017 | Tunnell | .................. | G06Q 40/04 |
| 2020/0151815 A1 * | 5/2020 | Whitfield | ............... | G06Q 40/04 |
| 2020/0320343 A1 * | 10/2020 | Cohen | .................... | G06N 20/00 |

(Continued)

OTHER PUBLICATIONS

DNN-ForwardTesting: A New Trading Strategy Validation using Statistical Timeseries Analysis and Deep Neural Networks ARXIV (Year: 2022).*

(Continued)

*Primary Examiner* — Bruce I Ebersman

(57) ABSTRACT

A novel computerized method for selecting assets suitable for trading considerations is based on defining an integral score characterizing the extent of deviations of the time series of selected parameters changing over time from their average values. Assets with the most rapidly changed parameters are more attractive for trading than assets with only slightly changed parameters. A circular diagram is described as a visual indicator allowing rapid assessment of many assets with dramatically different price values and other parameters and comparing one asset to another.

13 Claims, 25 Drawing Sheets

(56) References Cited

U.S. PATENT DOCUMENTS

| | | | | |
|---|---|---|---|---|
| 2021/0142400 A1* | 5/2021 | Kinker | ............... | G06F 3/14 |
| 2022/0092697 A1* | 3/2022 | Ma | ............... | G06N 3/08 |
| 2022/0318906 A1* | 10/2022 | Ram | ............... | G06F 40/18 |
| 2022/0347552 A1* | 11/2022 | Svengalis | ............... | A63F 1/04 |
| 2024/0078644 A1* | 3/2024 | Veloso | ............... | G06T 5/77 |

OTHER PUBLICATIONS

A Genetic Algorithm (GA) Approach to the Portfolio Design Based on Market Movements and Asset Valuations, IEEE (Year: 2013).*

A Genetic Algorithm (GA) Approach to the Portfolio Design Based on Market Movements and Asset Valuations IEEE (Year: 2020).*

Design and Implementation of Algorithmic Stock Trading, IEEE (Year: 2023).*

* cited by examiner

AMZN

| Timeframes | Number of crossed borders | | | Integral score |
|---|---|---|---|---|
| | Price | Volumes | Mentions | |
| 15m | 3 | 2 | 3 | |
| 30m | 3 | 3 | 2 | |
| 1h | 2 | 2 | 3 | 23 |

NFLX

| Timeframes | Number of crossed borders | | | Integral score |
|---|---|---|---|---|
| | Price | Volumes | Mentions | |
| 15m | 2 | 2 | 2 | |
| 30m | 3 | 3 | 2 | |
| 1h | 2 | 2 | 3 | 21 |

PLTR

| Timeframes | Number of crossed borders | | | Integral score |
|---|---|---|---|---|
| | Price | Volumes | Mentions | |
| 15m | 2 | 1 | 1 | |
| 30m | 2 | 2 | 2 | |
| 1h | 2 | 2 | 3 | 17 |

FIG. 11

TSLA

| Timeframes | Number of crossed borders | | | Integral score |
|---|---|---|---|---|
| | Price | Volumes | Mentions | |
| 15m | 3 | 3 | 1 | |
| 30m | 2 | 3 | 2 | |
| 1h | 1 | 2 | 3 | 20 |

FIG. 12

METHODS FOR SELECTING ASSETS SUITABLE FOR TRADING CONSIDERATION AND VISUAL PRESENTATIONS THEREOF

CROSS-REFERENCE DATA

This patent application claims the priority date benefit from a co-pending U.S. Provisional Patent Application No. 63/416,466 filed on 14 Oct. 2022 by the same inventor and entitled "Methods for assessment of selected securities and graphical representation thereof." This patent application also claims a priority date benefit from a co-pending U.S. Provisional Patent Application No. 63/452,104 filed on 14 Mar. 2023 by the same inventor and entitled "ASSESSMENT METHODS FOR SELECTING ASSETS SUITABLE FOR TRADING CONSIDERATION AND VISUAL PRESENTATIONS THEREOF." Both documents are incorporated herein in their respective entireties by reference.

BACKGROUND

Without limiting the scope of the invention, its background is described in connection with trading securities. More particularly, the invention describes methods of screening assets to quickly identify those assets that are suitable for trading considerations.

Many strategies are employed by investors and traders to buy and sell securities and other publicly traded assets, such as stocks, options, currencies, or futures, with the goal of making a profit from the price movements. Traders use a variety of technical analysis tools, such as charts and indicators, to identify short-term and long-term price movements and trading opportunities. Trading success depends on a trader's ability to analyze market trends and make timely decisions to buy or sell an asset.

Selecting the best tickers for trading is not an easy task and requires significant effort and skill. One of the primary considerations traders face is market volatility. The stock market can be unpredictable, and it can be challenging to determine the direction a particular stock will move in the short- or long-term. This makes it challenging to identify the best stocks to trade.

Another challenge is the overwhelming amount of information available to traders. They must sort through financial reports, news articles, and social media posts to find relevant data, which can be time-consuming and challenging. Technical analysis is another key aspect of trading, but it can be complex and require significant skill and experience to understand and interpret charts and indicators.

The need exists, therefore, for a method of screening a large number of assets to identify those that are the most interesting for trading considerations.

There is also a need for asset traders to have an easy-to-understand visual indicator for each ticker that can convey a lot of information in a simple-to-understand manner is crucial. Traders need to analyze a large amount of data to identify profitable trading opportunities quickly. Visual indicators are powerful tools that can help traders make informed decisions quickly. A visual indicator should display essential data such as price, volume, trends, and volatility in a simple and intuitive way. By using a visual indicator, traders can easily identify trading opportunities, monitor their positions, and make timely decisions to enter or exit certain positions.

Visual indicators help traders to see trends, patterns, and changes in the market in real time. This information is essential for making informed decisions and executing trades in a timely, often rapid manner. A simple and easy-to-understand visual indicator can help traders to save time and effort in analyzing complex data, allowing them to focus on executing trades. By having a clear and concise visual representation of the data, traders can easily identify the direction of the trend, the strength of the trend, and the level of volatility in the market. This information is crucial in identifying profitable trading opportunities and managing risk effectively.

The need exists, therefore, for an improved visual indicator that is simple and intuitive in use and can help asset traders to maximize their profits and minimize their risk in a fast-paced and dynamic market environment.

SUMMARY

Accordingly, it is an object of the present invention to overcome these and other drawbacks of the prior art by providing a novel method for selecting assets suitable for trading considerations.

It is another object of the present invention to provide a novel method of screening assets and securities in a rapid manner to keep pace with dynamic market fluctuations.

It is yet another object of the invention to provide a method of screening assets that allows one to compare one asset to another while these assets have different price points, trading volumes, and other parameters changing over time.

It is a further object of the present invention to provide a novel visual indicator presenting the results of the method of selecting assets for trading considerations in a simple-to-understand and easy-to-read form while conveying a greater amount of information about multiple parameters of selected assets all at the same time.

It is yet a further object of the present invention to provide a visual indicator of multiple asset characteristics allowing rapid comparison of one asset to another.

The method of the invention is based on a concept of normalizing individual parameters changing over time, which then allows comparing one asset to another. The method may be implemented on a computer and may include the following steps:

a. using a computer to access at least one database to obtain data characterizing available publicly traded assets at one time. The database may be accessed directly or remotely and may include trading data and statistics characterizing a number of publicly-traded assets over a selected period of time;

b. using a user interface of the computer to select at least two, a subset of, or all assets for further analysis from all available assets of the database. Most likely, a large number of assets may be evaluated at the same time, such as at least 100 assets, at least 1,000 assets, or even more;

c. using the computer, select one or more parameters changing over time for characterizing each asset selected in step (b), for example, asset price, trading volume, the trading volume of options for the selected asset, social media mentions, etc;

d. using the computer, identify one or more time series corresponding to and defined by one or more timeframes (for example, a 15-minute, a 1-hour, a 4-hour, a 24-hour timeframe, etc.) for each selected parameter from data characterizing assets of step (a), wherein selected time series are the same for each selected asset;

e. operating the computer to automatically create for each selected time series one or more deviation bands using a deviation function, such as, for example, a Bollinger bands deviation function, wherein each deviation band is defined by a respective upper channel border and a lower channel border;

f. operating the computer to automatically identify each occurrence of crossing the upper channel border or the lower channel border of each channel by each time series for each selected asset, each occurrence of crossing representing an extreme behavior of the asset which is of interest to a trader;

g. operating the computer to automatically calculate a total number of border crossings for each parameter for each selected asset, the total number representing a further indication of the extreme behavior of the asset;

h. operating the computer to automatically calculate an integral score for each selected asset based on adding the total number of border crossings in step (g), and i. using the computer to present the results of calculations in step (h) to facilitate comparing each selected asset to other selected assets using the respective integral score, wherein a higher value of the integral score indicates a higher deviation of the selected time series and to be used as a trading consideration.

The method may further include repeating these automated calculations every 15 minutes or on a different periodic basis, such that the analysis stays current with the fluctuating market conditions.

The method further includes representing the results of these calculations in a form of a graphical object for each selected asset, the graphical object may be a linear histogram or a circular diagram representing the integral score and its components. The use of circular diagrams may represent an easy-to-understand method of selecting the assets for trading considerations, in which assets with a more completely filled circle are those with the most extreme deviations of the selected parameters changing over time from their average values, which is of most interest to traders.

The method of the invention allows an easy-to-see comparison of assets with different price values and trading volumes as the parameters are normalized for each selected asset. The method of the invention further allows a trader to identify assets with the most rapidly changed parameters among a large number of other publicly-traded assets, which is otherwise difficult to do while staying current with the fluctuating market conditions. As a result, the method of the invention is aimed at saving time by focusing the trader's attention only on the time series for assets that exhibit the greatest deviation from their average values; thereby, trading decisions can be made significantly faster, and trading opportunities may not be missed.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through the use of the accompanying drawings, in which:

FIG. 11 is an example of calculating the number of crossed borders of deviation bands for several selected assets, FIG. 12 is the example of data for creating an exemplary circular diagram for FIG. 13.

DETAILED DESCRIPTION OF PREFERRED EMBODIMENTS OF THE INVENTION

Figure 1:
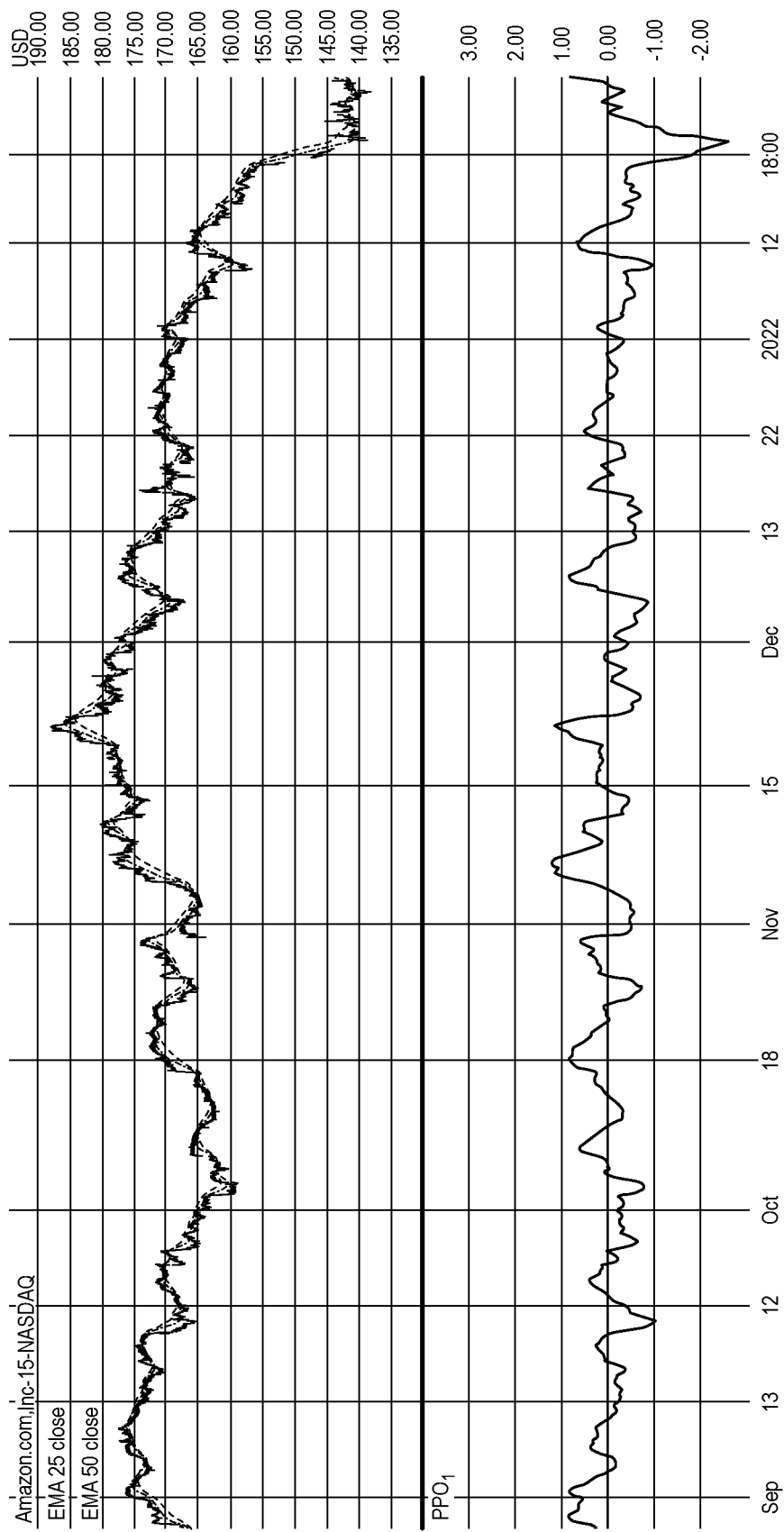
FIG. 1 is an exemplary price chart and deviation chart (Price Percentage Oscillator) of one publicly-traded asset.

The following description sets forth various examples along with specific details to provide a thorough understanding of claimed subject matter. It will be understood by those skilled in the art, however, that claimed subject matter may be practiced without one or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Definition of Certain Terms

Certain terms are used throughout this description and are now defined to better understand their specific meaning.

An "asset" is defined herein as a resource with economic value that an individual, corporation, or country owns or controls with the expectation that it will provide a future benefit. For the purposes of this description, the term "asset" is used to denote an asset that is publicly traded on at least one major exchange. Note that the asset may be characterized by one or more tickers related to the same asset.

A "ticker", is an abbreviation used to uniquely identify publicly traded assets on a particular stock market. It is a unique symbol or code assigned to a particular security, such as a stock, bond, option, or futures contract, that identifies it on an exchange. The ticker is a combination of letters or numbers, and it serves as a shorthand for the security's name. For example, the ticker for Apple Inc. is "AAPL," and the ticker symbol for the S&P 500 Index is "SPX." Traders use the ticker to quickly identify the security they want to trade and to monitor its price movements in real-time.

The ticker symbol is important because it allows traders to easily buy and sell securities on an exchange. By entering the ticker symbol into their trading platform, traders can access real-time quotes, place orders, and monitor their positions. The ticker symbol is also used in financial news and research, making it easier for traders to stay up-to-date on market developments related to a particular security.

The present invention describes a method for selecting (filtering) assets for further trading consideration by a trader. The invention may help a trader to periodically (for example, once every hour) identify a selected number of assets with the most dramatic and simultaneous changes in several predetermined parameters changing over time with respect to one or more predetermined time series from the entire asset space (more than 13,000 assets are currently traded on the stock markets). The method of the invention allows for the first time to rapidly assess and compare a large number of assets with dramatically different price values using several parameters simultaneously.

The following are non-limiting examples of parameters that may be considered for asset trading considerations:
price,
asset trading volume in physical terms or in monetary terms,
total options trading volume for a particular asset,
options trading volume in certain option strikes for a particular asset, including Call options and Put options,
implied volatility in certain option strikes for a particular asset,
open interest,
mentions in social networks,
Earnings,
Revenue,
P/E ratio,
P/S ratio,
P/B ratio,
EPS (earnings per share),
Gross Margin,
Net Profit Margin,
Debt/Equity ratio,
Savings Rate,
ROE (return on equity),
Return on Assets,
Debt level,
Debt coverage,
Dividend yield ratio,
Free cash flow,
Projected earnings growth (PEG).

With regard to cryptocurrency, in addition to traditionally used price and volume fluctuations, social network mentions, as well as option prices over preselected periods of time, other parameters specific to cryptocurrency can also be used, such as their transaction volume in blockchains, both within each blockchain as well as between different blockchains.

The term "timeframe" denotes each period of time for which the parameter that changes over time, for example, ticker price and other market data, are combined and consolidated for the purposes of charting the time series for the particular asset. The term "time series" is used to describe a series of values for a selected parameter characterizing an asset over a certain period of time.

Other terms used herein are used in their conventional meaning as practiced for the purposes of analyzing financial data.

Description of the Method of the Invention

The method of the invention may be implemented as a computer program that runs on a single computer or a network of computers, which may comprise at least one server or at least one processor, at least one non-transient memory, at least one user interface device such as a display or a monitor, and equipped with a wired or wireless connection to facilitate access to at least one database storing financial data characterizing a plurality of assets. The computer used for the purposes of this invention may include a smartphone, a laptop, a tablet, or another electronic device that is capable of accessing the at least one database and performing the calculations described below for a large number of selected assets.

A lot of financial and other data characterizing various publicly-traded assets is readily available to the public, including a large number of traders seeking to monetize on a favorable movement of the asset price. The sheer volume of this data is so large, and the market conditions are changing so rapidly that identifying assets with rapidly moving prices is not an easy task for an average trader. Many trading opportunities are therefore missed because the trader cannot assess a large number of assets within a short period of time required to make informed trading decisions. The problem is exacerbated by the differences in absolute values of the price, trading volume, and other parameters characterizing one asset vs the other.

The method of the invention allows for identifying assets that are most suitable for trading using a novel approach, as described below in greater detail, and that cannot be replicated using conventional calculations.

The method of the invention is now described in greater detail and illustrated using a price chart of Amazon Inc. seen in FIG. 1, as can be provided from a financial data database when assessed by the computer performing the steps of the method. The rate of Amazon ticker price change overtime may be assessed using various indicators. One useful example is a Percentage Price Oscillator (PPO), which shows deviations in the price on a normalized basis.

PPO may be calculated using the following equation:

$$\text{PPO} = \{(\text{EMA}(K) - \text{EMA}(N))/\text{EMA}(N)\} \times 100 \quad (1)$$

where EMA is the exponential moving average, K and N are selected time periods for calculating EMA, wherein K is less than N.

In embodiments, other moving average parameters may also be used in place of EMA, for example, a Simple Moving Average (SMA), as the invention is not limited in this regard.

FIG. 1 shows an exemplary price chart for Amazon Inc. (ticker AMZN). Price points are positioned with 15-min timeframe intervals. EMA with a period of 25 min (K=25) is shown in a dashed-dotted black line, and EMA with a period of 50 min (N=50) is shown in a dotted line in the upper portion of the chart. A corresponding PPO is seen in the lower part of the figure. It is referred to as $PPO_1$ to separate from other PPO charts shown for other situations in various figures accompanying this description.

Figure 2:
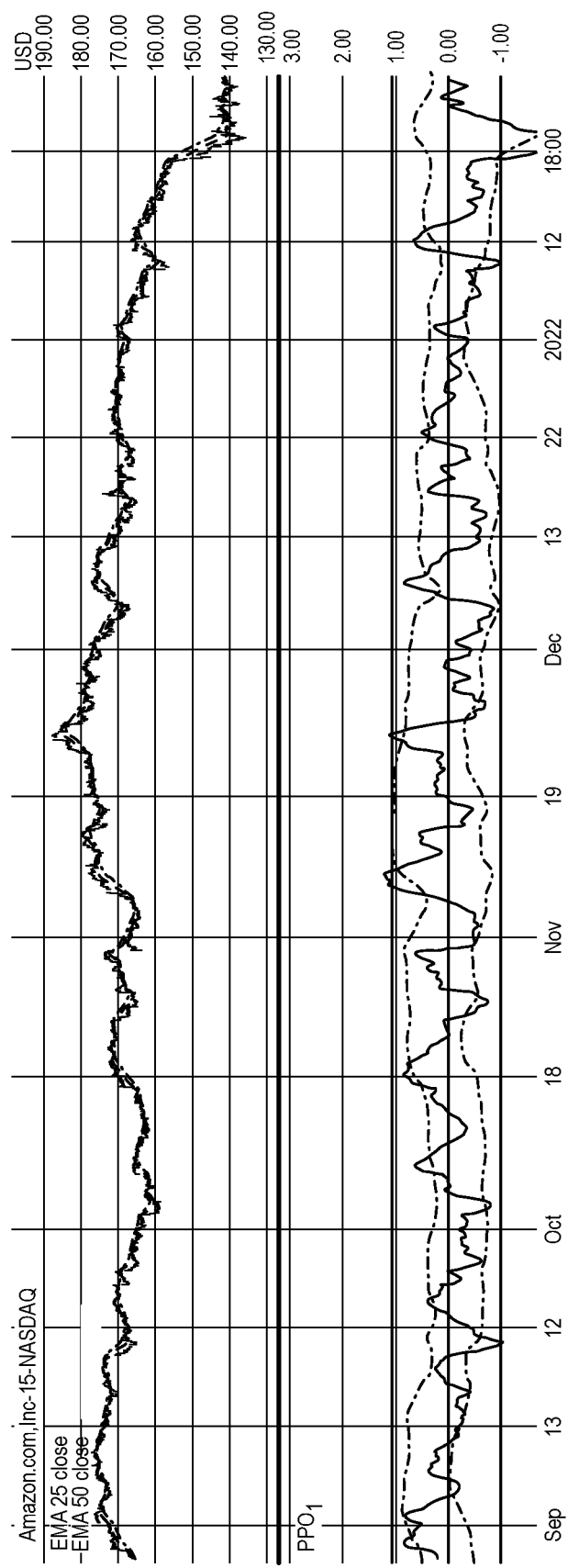
FIG. 2 is the same with the oscillator channel borders defined by a first deviation band.

FIG. 2 shows the same chart, but in the lower part of the chart, the $PPO_1$ solid line is accompanied by two dash-dotted lines above and below thereof. These lines represent a deviation band. In the following description, the term "band" and the term "channel" are used interchangeably. Various deviation band concepts may be used for the purposes of this invention. One useful example of deviation bands is Bollinger Bands. Bollinger Bands are a popular technical analysis tool used by traders to make trading decisions. The bands generally consist of two lines separated from the moving average ($PPO_1$ in this case) by a certain number of standard deviations. The two outer lines define the upper channel border and the lower channel border, seen as dash-dotted lines in FIG. 2.

In general, when the market is volatile, the bands expand, indicating increased volatility, and when the market is stable, the bands contract, indicating reduced volatility. Traders can use Bollinger Bands to identify potential breakouts, reversals, and trend continuations. For example, when the middle line touches or breaks through the upper channel border, it may indicate that the asset is overbought, and a potential reversal may occur. Conversely, when the PPO touches or breaks through the lower channel border, it may indicate that the asset is oversold, and a potential reversal may occur. Overall, Bollinger Bands are a useful example of a tool for traders to identify potential trading opportunities based on volatility, support and resistance levels, and trend direction.

In addition to Bollinger Bands, other deviation bands are also suitable for the purposes of the present invention. Non-limiting examples of some alternative deviation bands are listed below:

Keltner Channels: Keltner Channels are similar to Bollinger Bands but use the Average True Range (ATR) to determine the width of the bands. The channels consist of an upper channel border, which is created by adding a multiple of the ATR to the moving average, and a lower channel border, created by subtracting a multiple of the ATR from the moving average, Donchian Channels: Donchian Channels, also known as price channels, are created by plotting the highest high and lowest low over a specified period. The channels encompass the price action, with an upper channel representing the highest high and a lower channel representing the lowest low.

Envelopes: Envelopes consist of two lines plotted above and below a moving average. The upper channel border line is a set percentage or value above the moving average, while the lower channel border line is a set percentage or value below the moving average, and Moving Average Envelopes: Moving Average Envelopes are similar to standard envelopes but use a moving average as the basis instead of a fixed value. The upper and lower channel border lines are plotted as a certain percentage or value away from the moving average.

The following discussion is illustrated using the Bollinger bands as an example of the deviation bands. Referring back to FIG. 2, the dash-dotted lines in the lower part of the figure indicate an example of the Bollinger bands with the averaging period of 255 days and a 1.5 standard deviation defining the width of the deviation channel. As can be appreciated by those skilled in the art, other values of standard deviation may also be used, such as 1, 2, or more values, as the invention is not limited in this regard.

Also of note is an observation that using simple constants (such as 1 and −1 lines shown in FIG. 2) to assess the $PPO_1$ fluctuations would not produce as many accurate predictions of the local price extremes. In this example, the $PPO_1$ crosses over the 1 and −1 lines only 4 times, while it crosses the dash-dotted lines as many as 16 times.

The $PPO_1$ and the Bollinger Bands channel appear to be close to one another because, in the selected averaging period of time of 255 days, the price fluctuations for this particular asset were not so large, staying within approximately a 20% range. As can be appreciated by a person skilled in the art, price fluctuations over a longer period of time may be much higher. To assess the price fluctuations over such long periods of time, one can create other PPO charts over longer periods of time, for example, by multiplying the parameters of the $PPO_1$ by a factor of 2 or 3.

Figure 3:
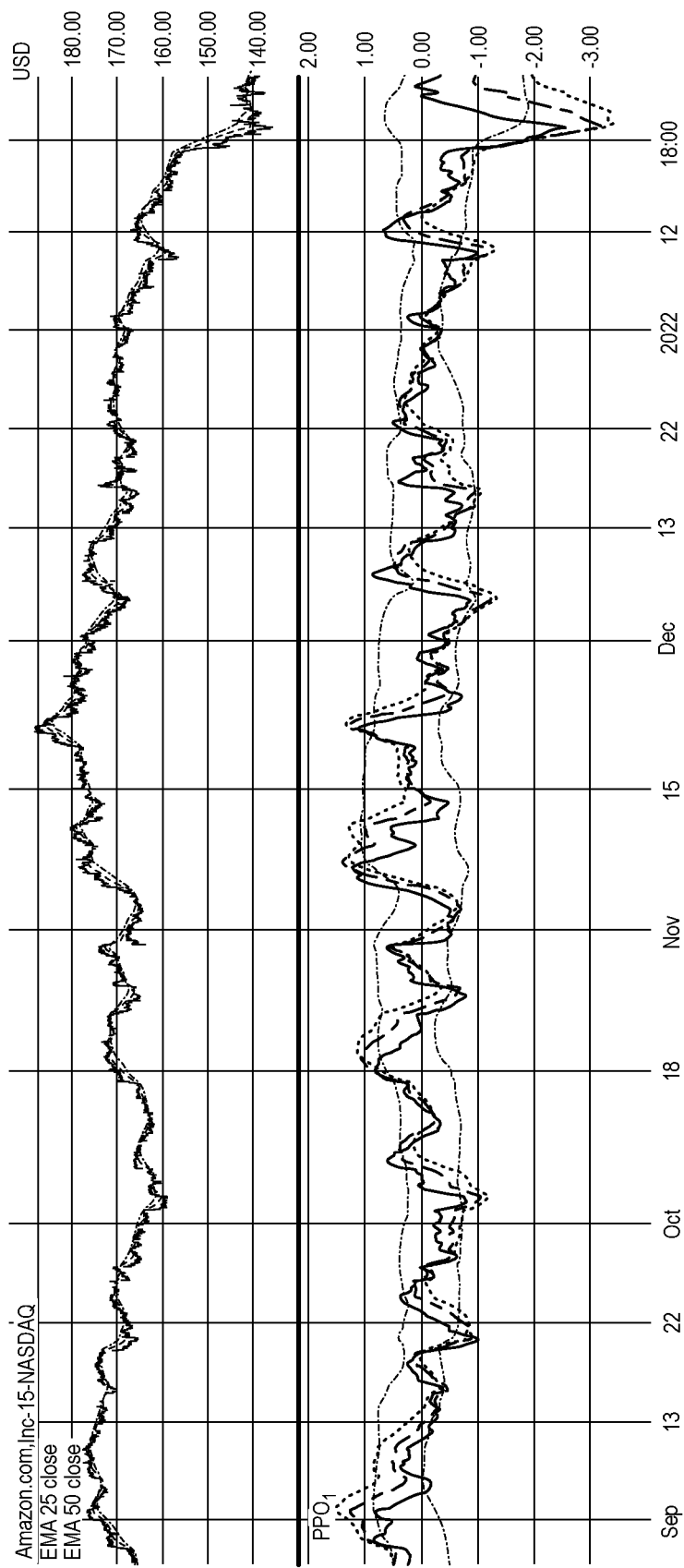
FIG. 3 is the same but with several deviation bands.

Examples of three additional PPO charts are presented in FIG. 3 to illustrate the assessment of the asset in this case. Short- and long-EMA in this example would be as follows: (25;50)—solid line; (50;100)—dashed line; and (75;150)—dotted line. These charts are shown in FIG. 3 to demonstrate that a higher averaging period for the corresponding PPO chart leads to a greater fluctuation amplitude of the PPO indicator. In this example, the dotted line shows the greatest fluctuation amplitude of the PPO parameter.

Figure 4:
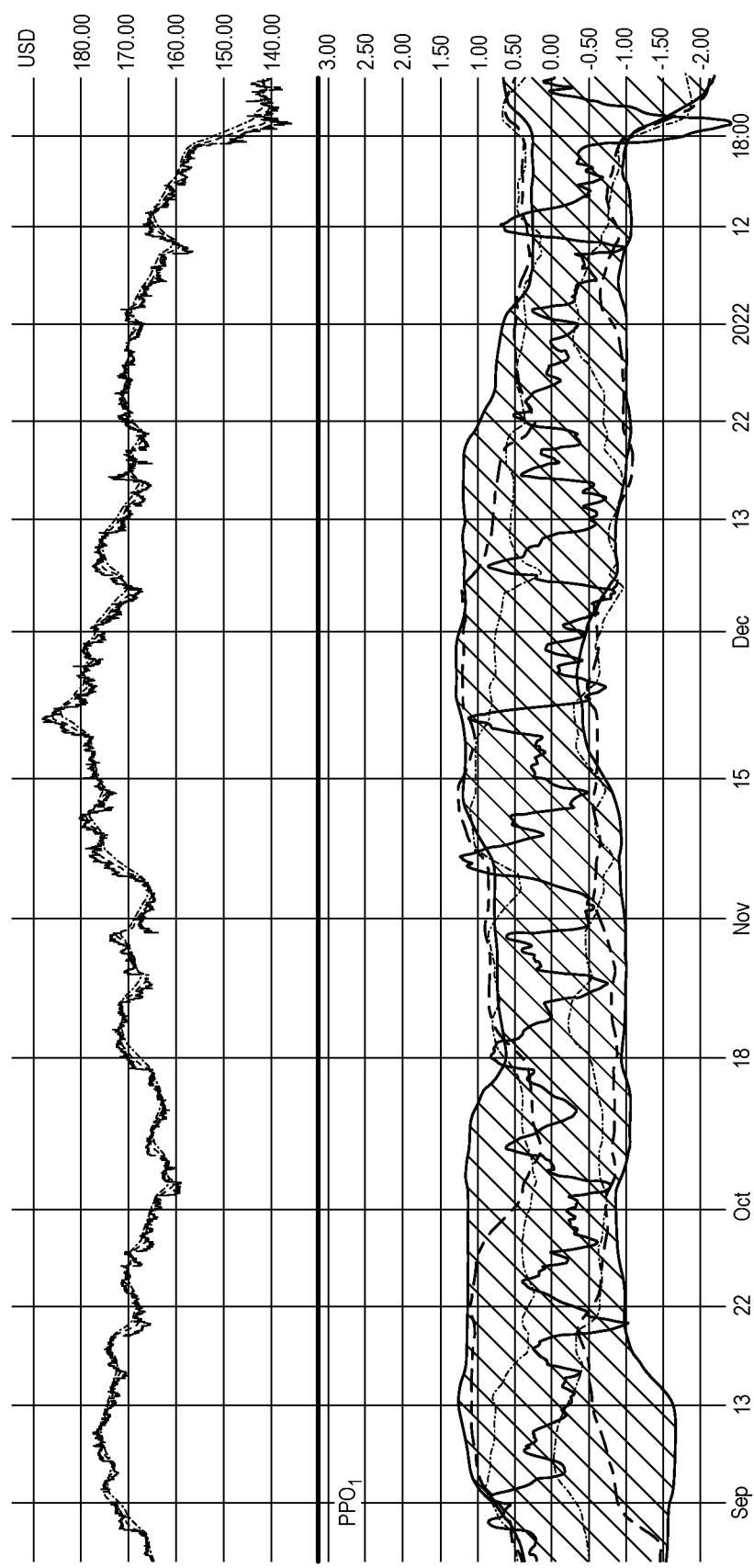
FIG. 4 is the same but with wider deviation bands created over longer periods of time.

Another variable that may affect the result of the analysis is the width of the deviation band. As can be appreciated by those skilled in the art of technical financial analysis, Bollinger bands will become wider when created over greater periods of time, as seen in FIG. 4. Of note is the simple moving average (SMA). For this exemplary case, the SMA is also a multiple of the initial SMA period, respectively 255×2 days and 255×3 days. The channel width outlined by the solid black lines is, therefore, the widest, while the initial channel width outlined by the dash-dotted lines is the narrowest.

FIG. 4 also illustrates a group of Bollinger Band channels that are "nested" together and vary only by the length of the averaging period. In general, the longer averaging period leads to wider channel width, as explained above.

When the $PPO_1$ line crosses one or more borders of one or more respective deviation band channels, it signifies a deviation of the $PPO_1$ line from its average value. The more borders are crossed, the more significant the change. One can also calculate the number of channels created using different timelines, which are crossed by the $PPO_1$ line as the system of coordinates by itself. This coordinate system is inherently normalized; in other words, it can be created for any ticker or any asset and for any asset price. For further analysis, the number of channel borders that are crossed over by the $PPO_1$ line is referred to as a Number of Crossed Borders (NCB). In the example above, if the PPO$_1$ line crosses 2 borders, the NCB number equals 2. If the PPO chart crosses 3 borders, the NCB number equals 3, and so on.

Figure 5:
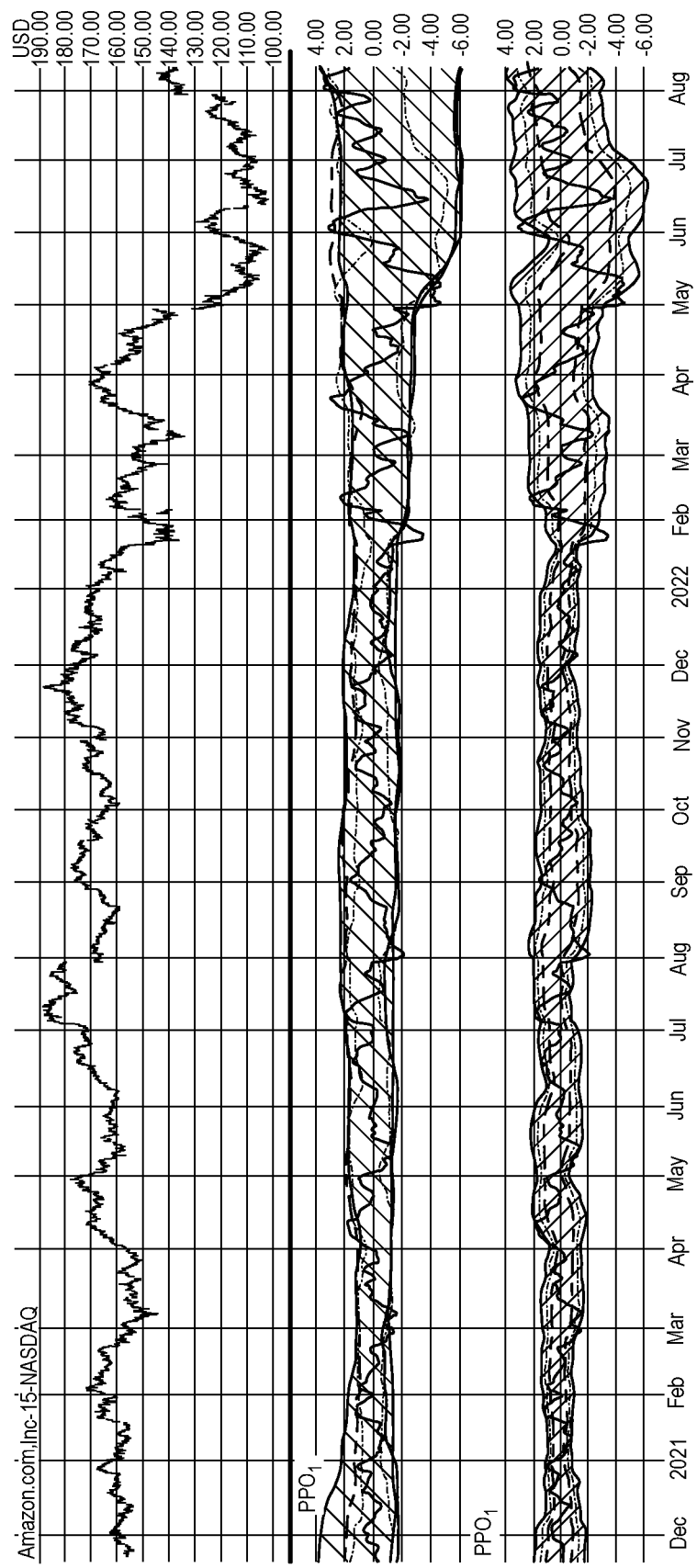
FIG. 5 is the same but with alternative deviation bands calculated using different initial settings.

In embodiments, the deviation band channels to supplement the PPO chart may be created using a somewhat different technique. In one exemplary case, several Bollinger Bands may be computed for several multiplication factors of the standard deviation. In further embodiments, several deviation bands may be created for several moving average intervals for the same PPO chart. Examples of such deviation bands are seen in the lower part of FIG. 5 with cross-hatched bands as indicated in the drawing. The two "nested" groups of deviation bands are seen for older timeframes in the middle of FIG. 5 and the more recent timeframes in the lower part of FIG. 5. The older deviation bands are created using longer periods of averaging for EMA purposes. It may be advantageous to present all of these items on the same chart altogether.

Figure 6:
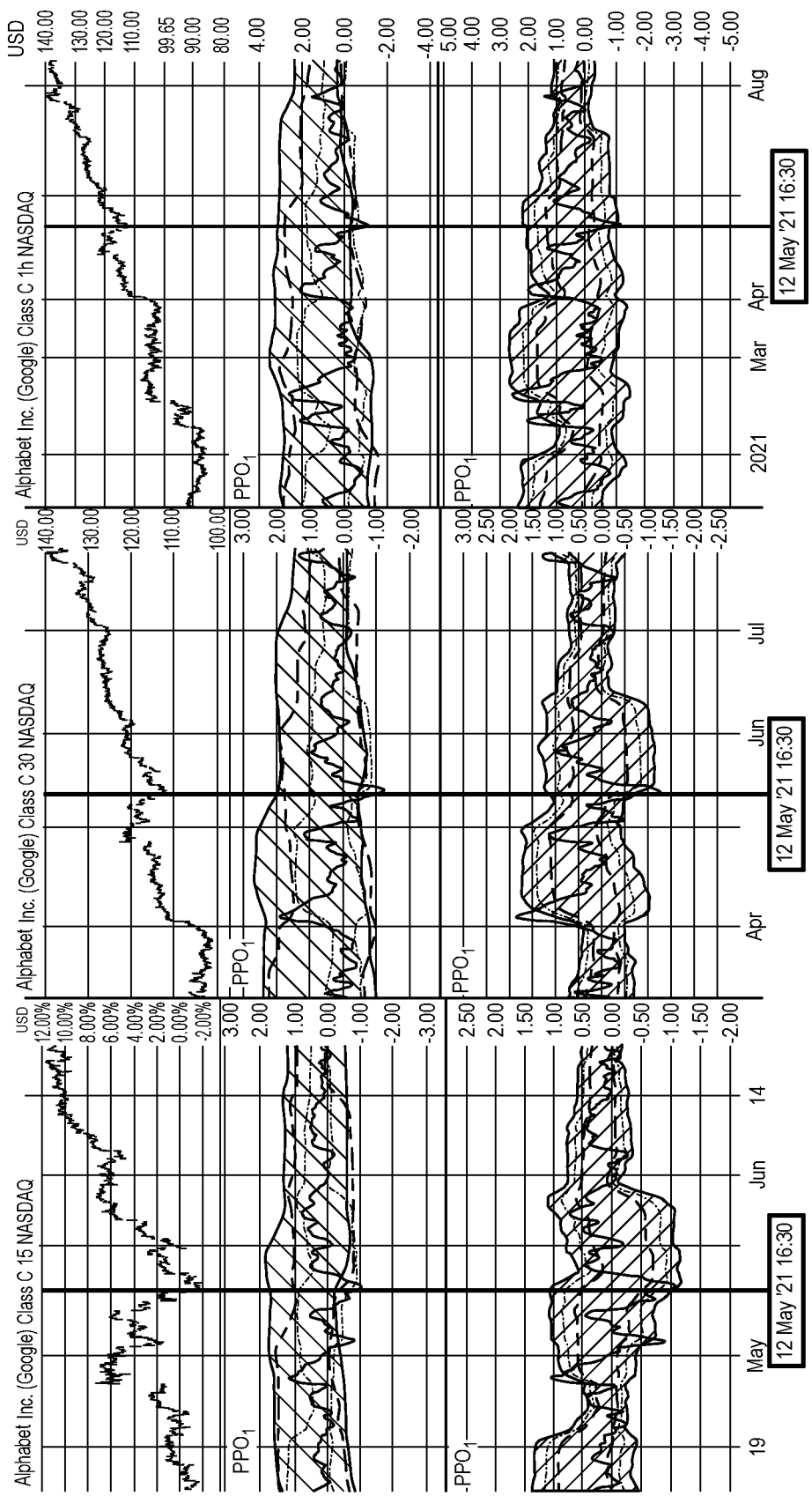
FIG. 6 is a comparison of the calculated number of crossed borders for the same asset using alternative techniques of defining deviation bands.

FIG. 6 illustrates various deviation bands for the same asset and shows that NCB value at the time point of 16:30 on Dec. 5, 2021 is the same and equals 3 regardless of which of the above-described calculation methods is used for the PPO chart analysis. This is not expected to be the case all the time, however. Still, for the purposes of this discussion, the methodology of the invention may be understood to be the same regardless of small differences in specific calculations.

As discussed above, the method of the invention allows the detection of the greatest price fluctuation for any ticker at any price, and thereby it constitutes a universal approach allowing to compare one asset against another or against a group of other assets at any point in time.

Figure 7:
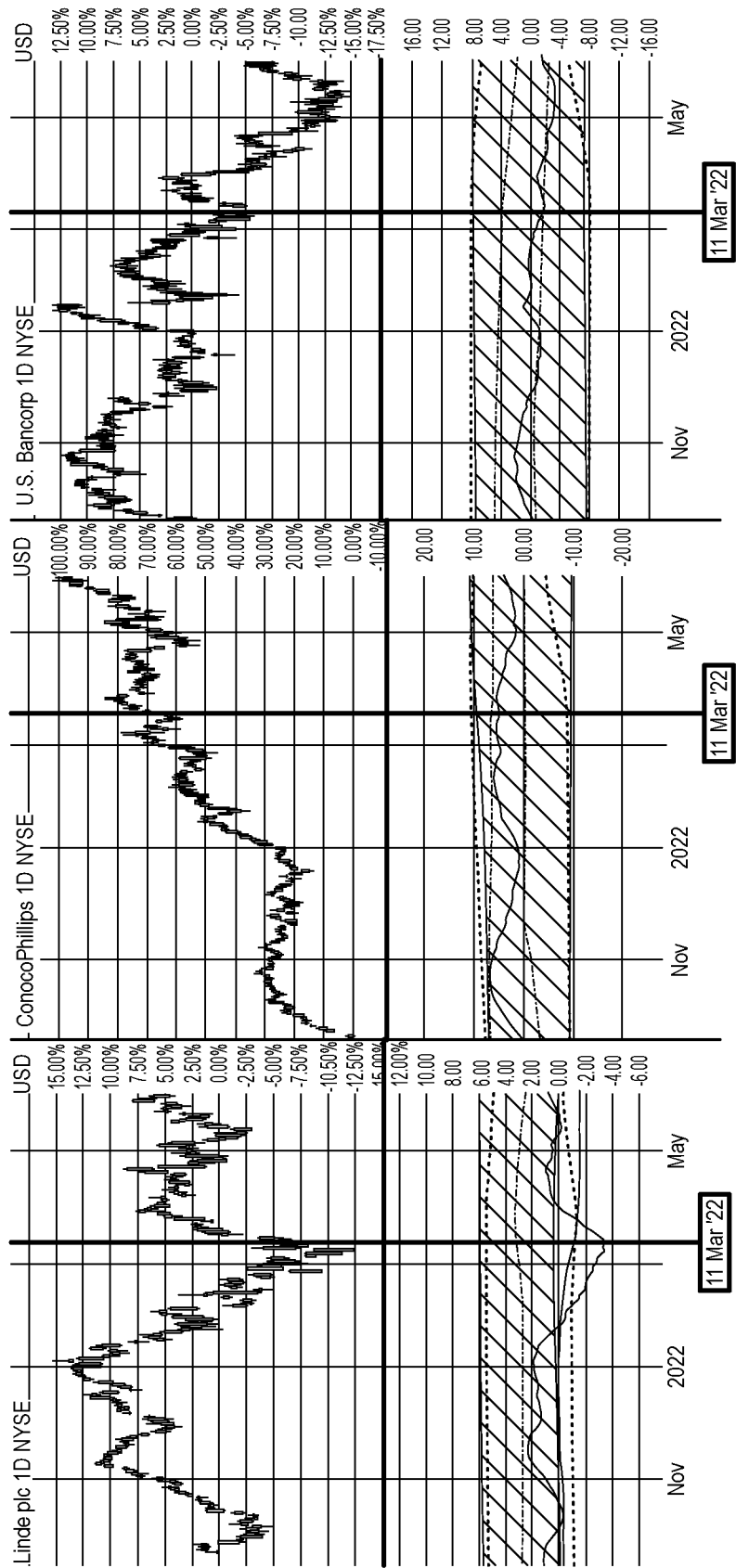
FIG. 7 is a chart illustrating the number of crossed borders calculated for three different assets traded on the same day.

FIG. 7 illustrates this point in greater detail: the NCB values at the same time point of Mar. 11, 2022 (daily timeframe is used) are as follows: Linde plc—3; ConocoPhillips—0; U.S. Bancorp—1. This illustrates that the method of the invention allows for comparing very different assets with each other. FIG. 7 also shows that the method of the present invention does not depend on a specific PPO fluctuation of one asset or another. The width of the cross-hatched channel is different for all assets, not to mention that both traditional trading criteria of price and volatility in their classical definition are also quite different. Nevertheless, the NCB value allows comparing such different assets with each other in order to identify the assets with the highest fluctuations from their normal values as normalized to their own respective rates of price and other parameter deviation.

Figure 8:
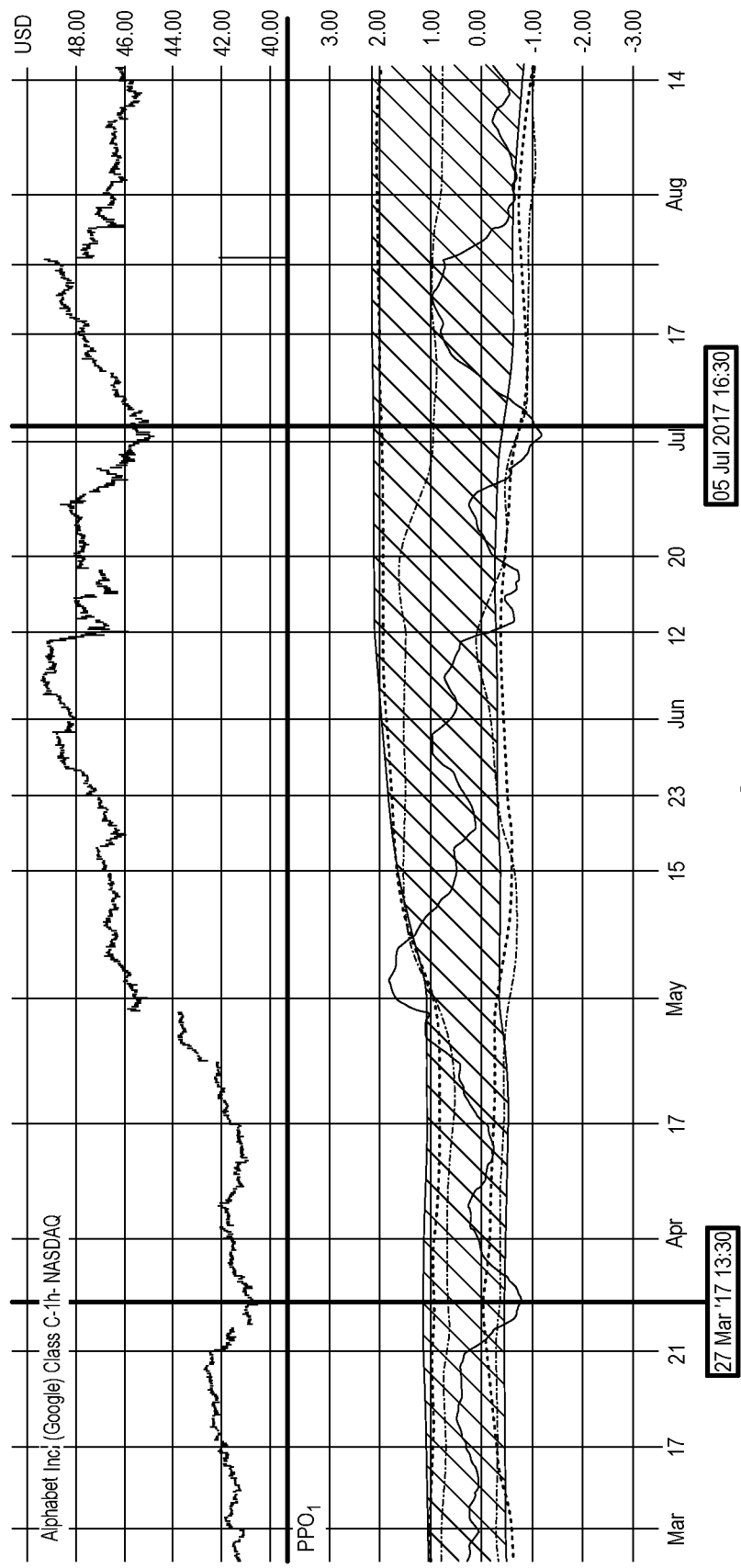
FIG. 8 is an example of an asset in which the borders of deviation bands are not nested one within the other but overlap and intersect one another.

As seen in FIG. 8, the deviation band channels for shorter periods of time do not always "nest" within the bands for longer periods of time. Occasionally they intersect and overlap. This does not impact the value of this analysis as the NCB value would still reflect the same number of crossed borders regardless of whether these respective bands overlap, nest, or intersect with each other. In the example of FIG. 8, NCB equals 3 on both selected dates.

Figure 9:
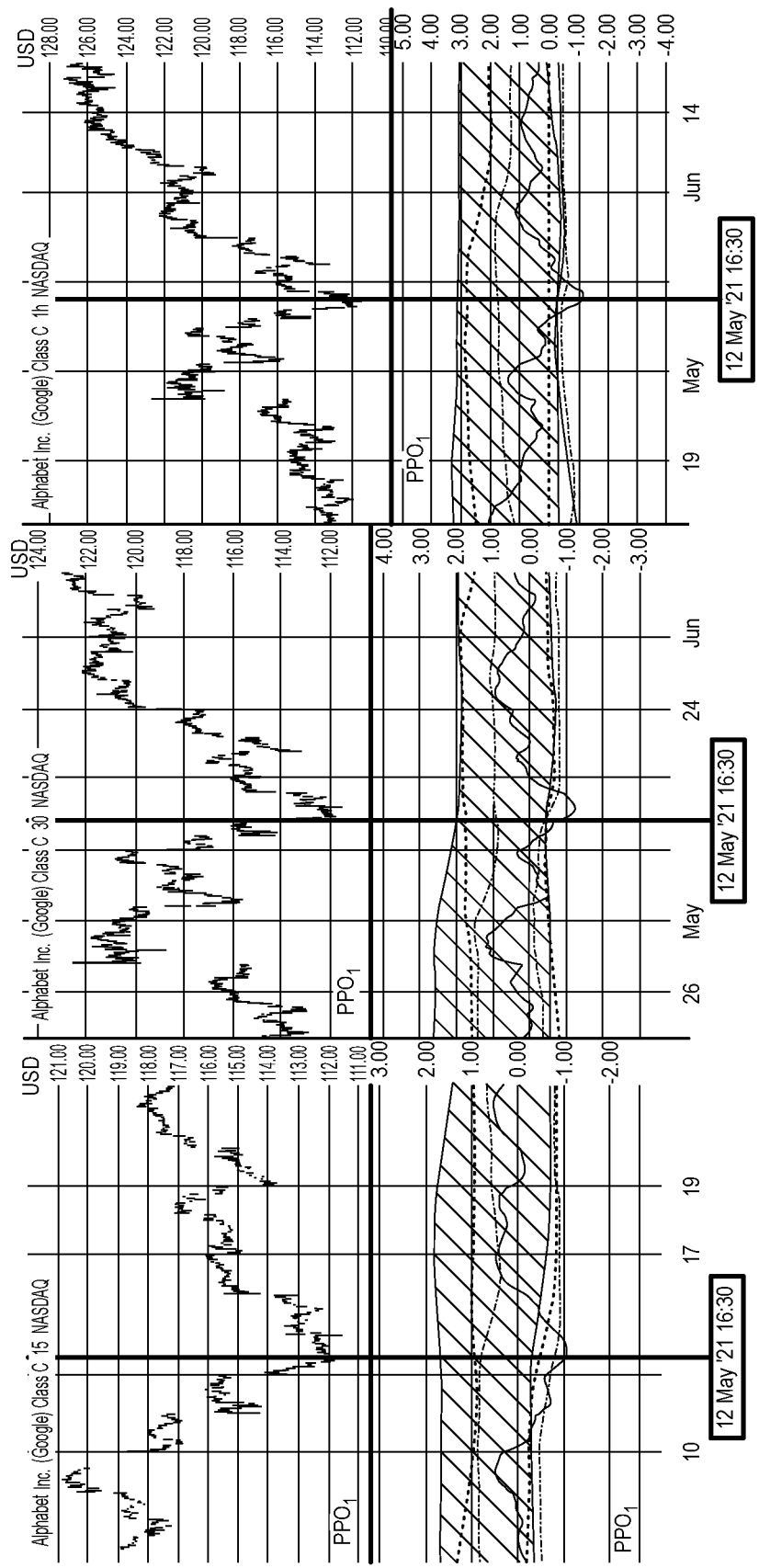
FIG. 9 is a comparison of the deviation bands for the same asset calculated at different timeframes.

FIG. 9 shows an example of applying the method of the invention for several timeframes at the same time. In particular, FIG. 9 shows the Google ticker in three different timeframes: 15 m, 30 m, and 1 h. The figure shows that the solid black line (PPO$_1$) crosses the borders of all three channels from top to bottom, which indicates extreme peak price behaviors in all three timeframes. Applying the analysis to more than one timeframe at the same time allows a more comprehensive assessment of the change in the rate of the price (or another parameter of interest) fluctuations at different timeframes. This allows finding the time point where the parameter of interest, such as price, deviates the most at selected timeframes.

One advantageous way to present this information as a graphical object for the trader is in a form of a circular diagram, as described below in greater detail. In order to quickly evaluate a ticker performance for a particular parameter changing over time (price, in this example) at different timeframes, a concept of a sector is introduced. A sector, in this case, is the sum of the NCB values of all timeframes considered for the analysis. For example, the total NCB value of the Google ticker price series at the time point of Dec. 5, 2021 at 16:30 in FIG. 9 will be as follows: 3 on the 15 m timeframe+3 on the 30 m timeframe+3 on the 1 h timeframe, for a total NCB score of 9.

Figure 10:
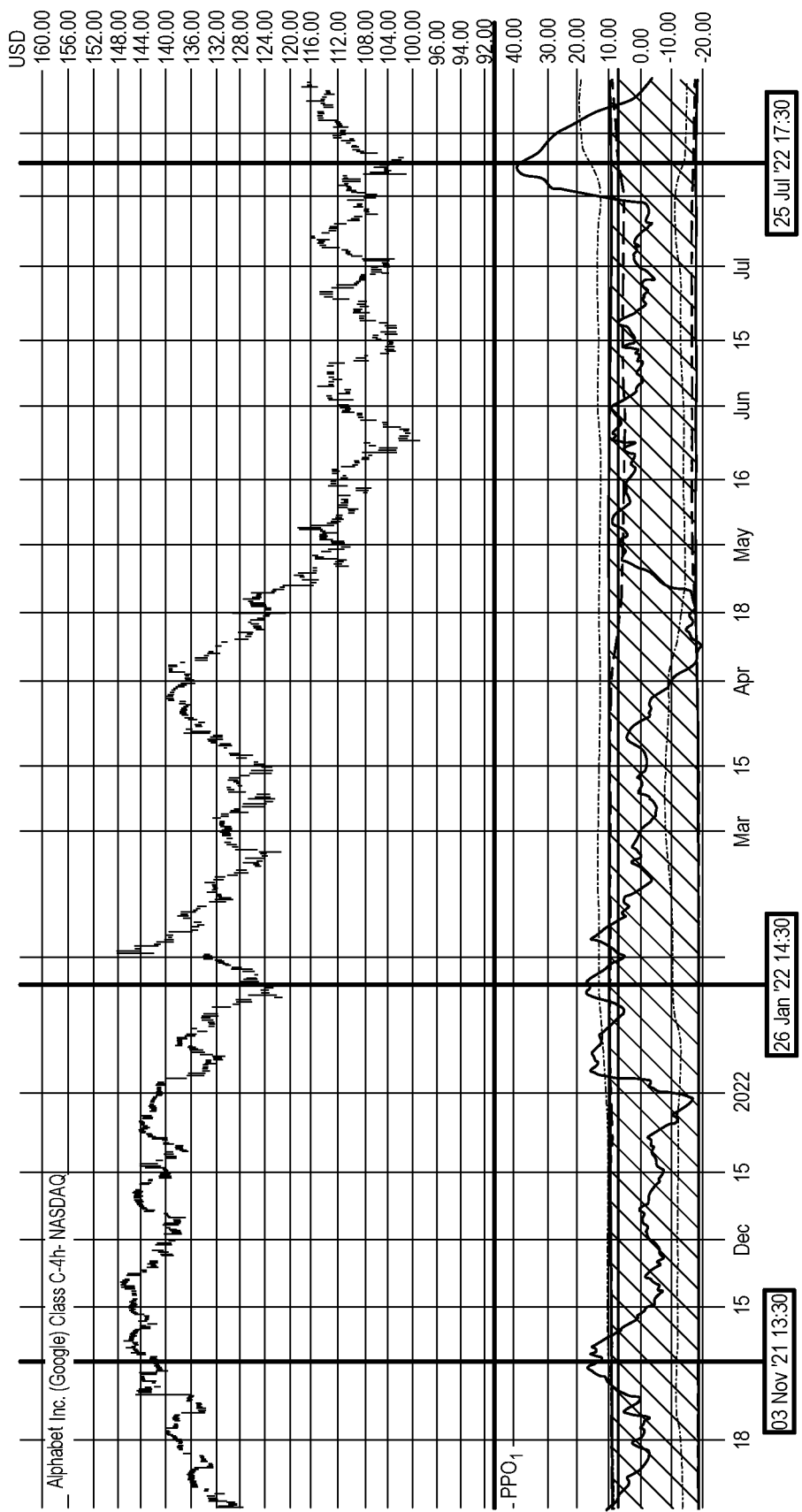
FIG. 10 is a chart showing that a change in one parameter frequently coincides with a change in another time-dependent parameter.

The method of the present invention may be adapted to be used with more than one parameter changing over time as mentioned above. The difference, in this case, is to use the PVO (Percentage Volume Oscillator) in place of the PPO, or another suitable metric of interest, which can be accompanied by deviation bands as described above. FIG. 10 shows an example of analyzing the percent volume change that frequently accompanies peak price change points.

In the case of volumes, only maximum peaks of the respective time-dependent volume parameter should be considered, since it is generally believed that it is the increase in trading volumes that confirms the points of ticker performance reversal. As for mentions in social media, this time series may be similar to the time series analysis of the trading volume.

According to the invention, the parameter analysis for the time series of social media mentions may be calculated in exactly the same way as the analysis for the trading volume. The confirming values of the turning points may be considered the time points at which the NCB is at its peak. The Percentage Mention Oscillator indicator (analogous to PPO and PVO) is one example of a suitable parameter changing over time that may be used in determining the overall NCB value.

According to the invention, the same or similar method may be applied to the evaluation of options. In fact, additional analysis with options may be based on various option-characterizing parameters changing over time that are not applicable in other fields, such as with groups of options, including ITM, ATM, and OTM. The cumulative volume (in natural or monetary terms) of all options trades of the same asset may also be used as yet another parameter for this analysis.

The following discussion extends the notion of analyzing one parameter changing over time to simultaneous analysis or a plurality of such parameter changing over time. This opens up a possibility of a more comprehensive, integral tickers assessment using an integral normalized assessment score within a single normalized coordinate system that is applicable to all selected tickers simultaneously. This integral score is the sum of the sums of all NCB values over a variety of timeframes and a variety of parameters characterizing each individual asset, such as price, the volume of stock trade transactions, number of mentions in social networks, volume of transactions in options, implied volatility, etc.

One example of the numeric data showing the results of such an assessment for several assets is presented in the form of tables in FIG. 11. The integral normalized assessment score of AMZN is the highest at 23 in this example and identifies the greatest deviation from its average parameter values, while the same for PLTR ticker is at the lowest level at 17, in terms of the totality of NCB values. In this example, only three tickers were analyzed for comparison to each other.

A large variety of parameters may be used in calculating the total integral score for each asset. The following is a ranked list of some of the factors and considerations for the best selection of the parameters for comparing one asset to another.

- Time series needs to be suitably selected. There is no need to analyze all possible time series; only a portion thereof may be used;
- A relative weight of each parameter changing over time may be introduced and adjusted as needed so it does not need to be 1 for all parameters;
- A number of timeframes in each sector needs to be carefully considered;
- A number of channels and a number of corresponding borders need to be selected to provide for the best outcome; and, finally
- EMA or SMA periods for all calculations of Percentage Oscillator values need to be selected properly.

To further improve the accuracy of the analysis, a back-testing method may be used. Backtesting assesses the viability of a trading strategy by discovering how it would play out using historical data. Using backtesting may allow the determination of the most effective values for analyzed asset parameters—both for the purposes of trading directly, as well as for detecting the most points in which the asset ticker reaches its extremum, which can be used later for further evaluation by other technical analysis methods.

The following is a recitation of the steps of the method of the present invention as described above in greater detail:

a. using a computer to access at least one database to obtain data characterizing available publicly traded assets at one time, b. using a user interface of the computer to select at least two, a subset of, or all assets for further analysis from all available assets of the at least one database, c. using the computer, select one or more parameters changing over time for characterizing each asset selected in step (b), d. using the computer, identify at least one time series corresponding to at least one selected timeframe for each parameter of step (c) from data characterizing assets of step (a), e. operating the computer to automatically create for each selected time series one or more deviation bands using a deviation function, each deviation band is defined by a respective upper channel border and a lower channel border;

f. operating the computer to automatically identify each occurrence of crossing the upper channel border or the lower channel border of each channel by each selected time series for each selected asset, g. operating the computer to automatically calculate a total number of border crossings for each selected parameter for each selected asset, h. operating the computer to automatically calculate an integral score for each selected asset based on adding the total number of border crossings in step (g), and i. using the computer to present the results of calculations in step (h) to facilitate comparing each selected asset to other selected assets using the respective integral score, wherein a higher value of the integral score indicates a higher deviation of the selected time series and to be used as a trading consideration.

In addition, the method of the invention may include a step (j) of repeating the analysis of steps (a) through (i) at least once or on a periodic basis to keep current in view of the changing market conditions. Such repeated calculations for all selected assets may be performed every 5 min, 10 min, 15 min, 20 min, 25 min, 30 min, 40 min, 45 min, 50 min, 60 min, 90 min, or using another predefined schedule or predefined triggers, as the invention is not limited in this regard. Examples of predefined triggers that may prompt the repeating of the steps of the method may include certain market conditions, such as reaching a fresh high or a fresh low for broad market indicators or exceeding a predefined market volatility threshold.

In further embodiments, initial and/or subsequent selection may include at least 100 assets, at least 200 assets, at least 500 assets, at least 1,000 assets, or another suitably large number of assets, and the method may have a step of ranking the results to identify the assets with the highest NCB value. In further yet embodiments, the asset selection may be done using a particular industry or a field of interest of the user, such as pharmaceutical assets, entertainment and hospitality assets, and so on.

In further embodiments, the steps of the method may be completed in a short period of time following a change in market conditions so as to present the user with the current assessment of the trading opportunities. In examples of the method, the calculations of the NCB may be done in real-time or in less than about one minute following the availability of the real-time market data so as to keep up with changing market conditions.

The following discussion discloses various ways to present the results of the analysis described above in the form of graphical objects that are easy to understand and interpret by the user. In particular, the NCB data may be presented as circular diagrams, with one circular diagram representing one asset under consideration. The underlying data for the circular diagram is seen in FIG. 12 as an example.

Figure 13:
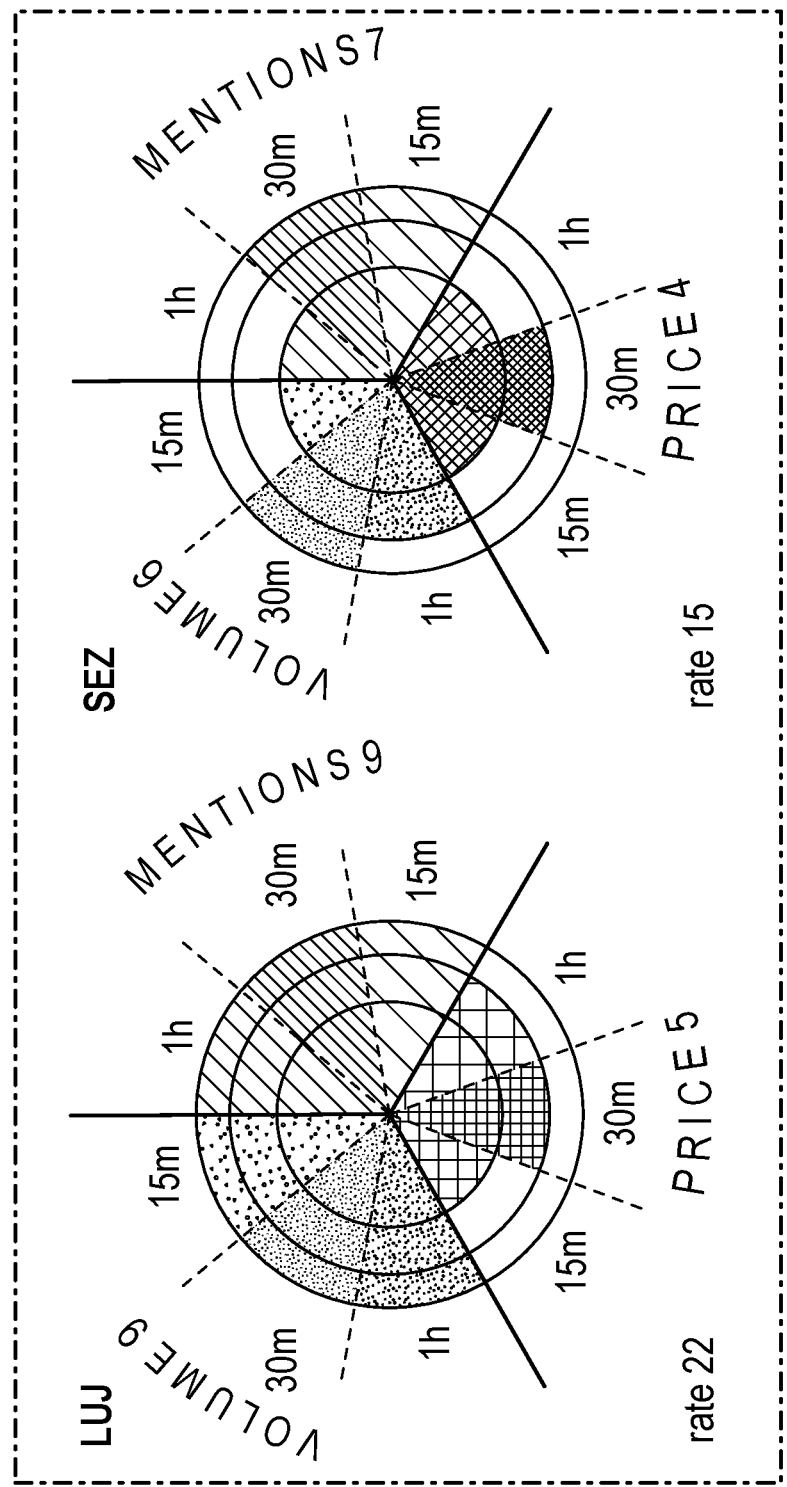
FIG. 13 shows two exemplary circular diagrams created using the method of the present invention.

Two examples of circular diagrams are seen in FIG. 13. A full circle of the diagram is divided into several evenly spaced apart sectors, wherein each sector is designated for the one corresponding parameter (such as price, trading volume, etc.), which changes over time. To visualize these sectors, each sector may have a designated color or a cross-hatching pattern, so each sector can be visualized to be different and distinct from all other sectors. The example in FIG. 13 has three main sectors devoted to asset price, trading volume, and mentions in social media. Each sector may have a name or a title describing what that sector represents, along with the total NCB score of that sector, for example, VOLUME 9. Within each sector, a number of sub-sectors may be provided, with each subsector corresponding to the selected timeframe, such as 15 min, 30 min, and 1 h, as seen in FIG. 13. Concentric circles may correspond to the number of borders crossed in each sector. Portions of the sector that are colored or filled with a cross-hatching pattern represent the number of crossed borders. The fuller the circle is, the more borders were crossed by the underlying parameter changing over time s, indicating a greater degree of deviation from their respective average values.

Using these circular diagrams allows the user to quickly perceive and identify assets with the most extreme behavior, which, therefore, may be more suitable for trading purposes. As explained above, the circular diagram illustration method and the underlying analysis are equally applicable to a broad range of assets and allow for rapid comparison of many trading opportunities in a short period of time. In the example in FIG. 13, LUJ has selected parameters that changed more rapidly that the same for the SEZ asset and, therefore, may be more suitable for a trading consideration.

Figure 14:
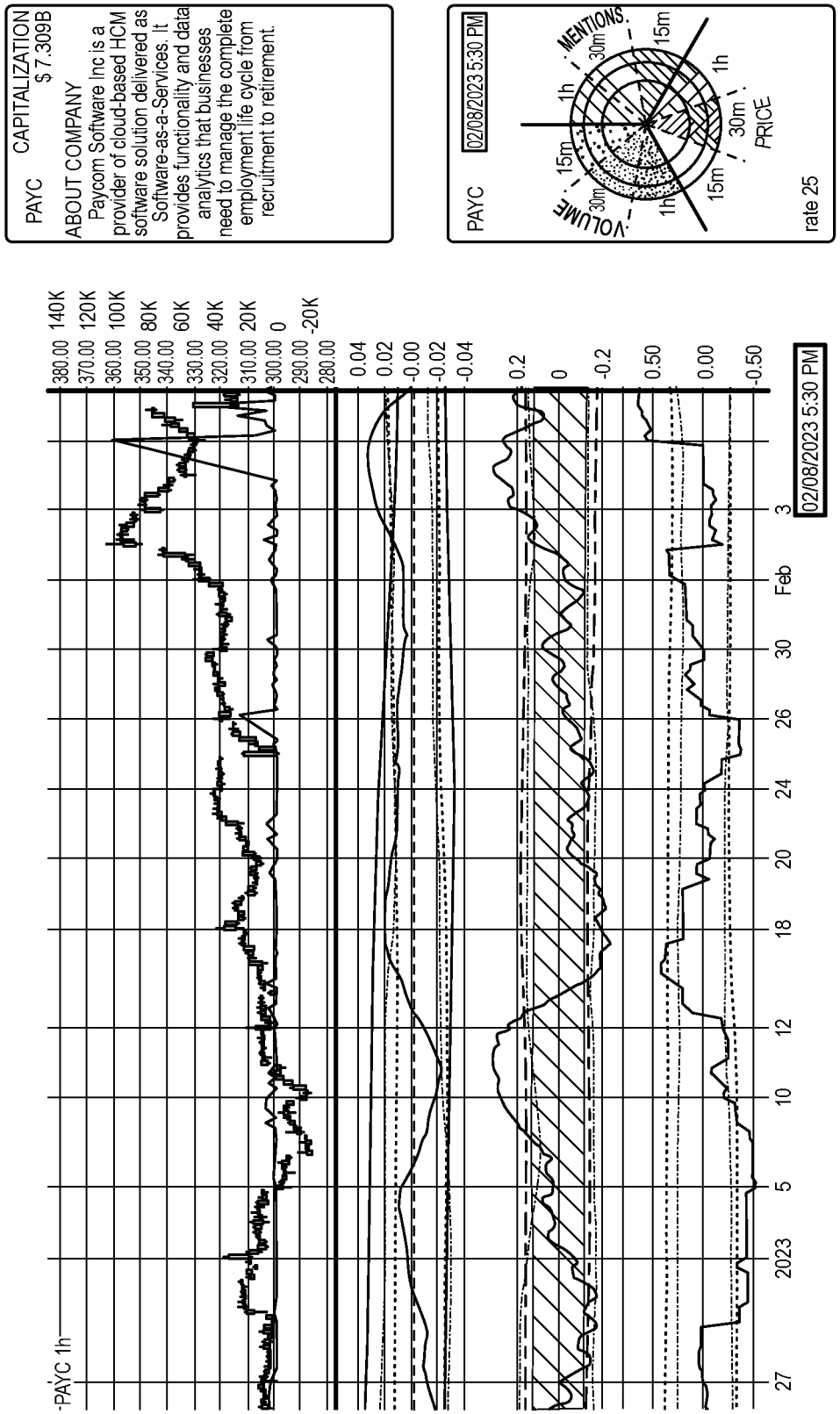
FIG. 14 is an example of a "compressed spring" situation with an exemplary asset.

In further embodiments, the circular diagram method may be used to illustrate not the number of CROSSED borders, but the number of UNCROSSED borders. In this case, in the price sector of the circular diagram, NCB points are awarded not for crossing a border, but rather for not crossing a border. This approach is useful for detecting ticker states that can be described as "a compressed spring"—that is, where the rate of change in the price time series is insignificant on different timeframes (either none or one border was crossed). At the same time, the rate of change in the timelines of mentions and trading volumes is high (the maximum number of borders was crossed). FIG. 14 illustrates an example of this situation. This figure shows that in the 1-hour timeframe, the time series of trading volume and social media mentions crossed all three borders. At the same time, the price and, accordingly, the rate of price change changed only slightly.

Figure 15:
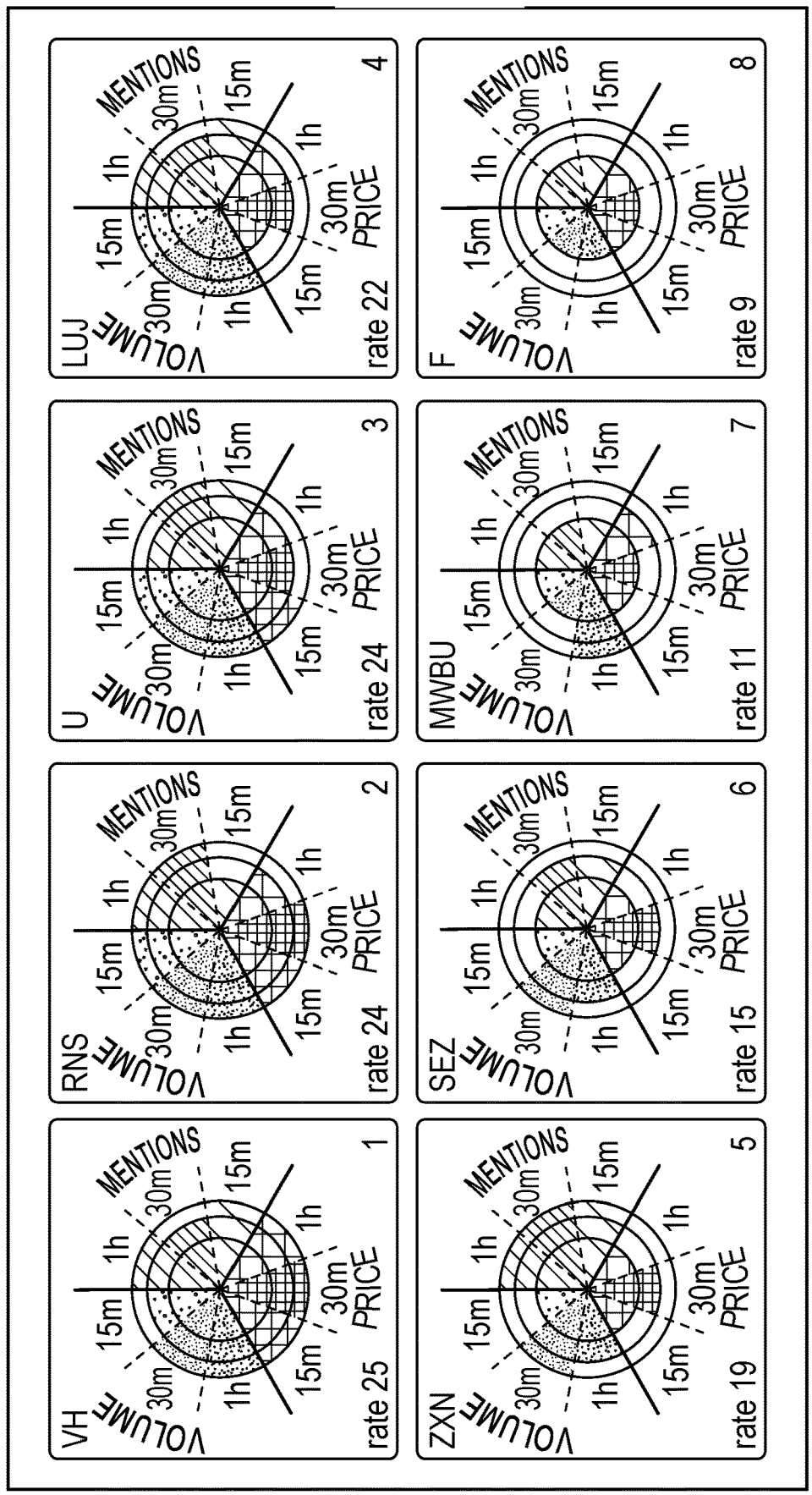
FIG. 15 is an example of several circular diagrams for different selected assets sorted in descending order of the integral score value.

In the normalized coordinate system described above, only a finite and small number of channels is generally used, typically 5 or less. Therefore, only a small number of channel borders are crossed, so all assets are studied only within this small number of borders. In other words, if almost the entire area of the circular diagram is filled with colors, then the ticker is worthy of consideration as a trading candidate. If only a small portion of the circular diagram is filled with colors, or if such filling is not uniform, such a ticker is not attractive as a trading candidate, as there are other opportunities out there. FIG. 15 shows a number of circular diagrams for various tickers sorted in descending order of the total integral score.

A further variation of the use of a circular diagram for the purposes of the present invention is now described in greater detail. It addresses one limitation of the circular diagrams shown above in that they only provide current information and do not provide a historical perspective thereof. A further version described below adds information about the dynamic behavior of the ticker in a manner analogous to the candle stick charts. In order to do so, three more elements are added to the circular diagram, as now described in more detail.

Figure 16:
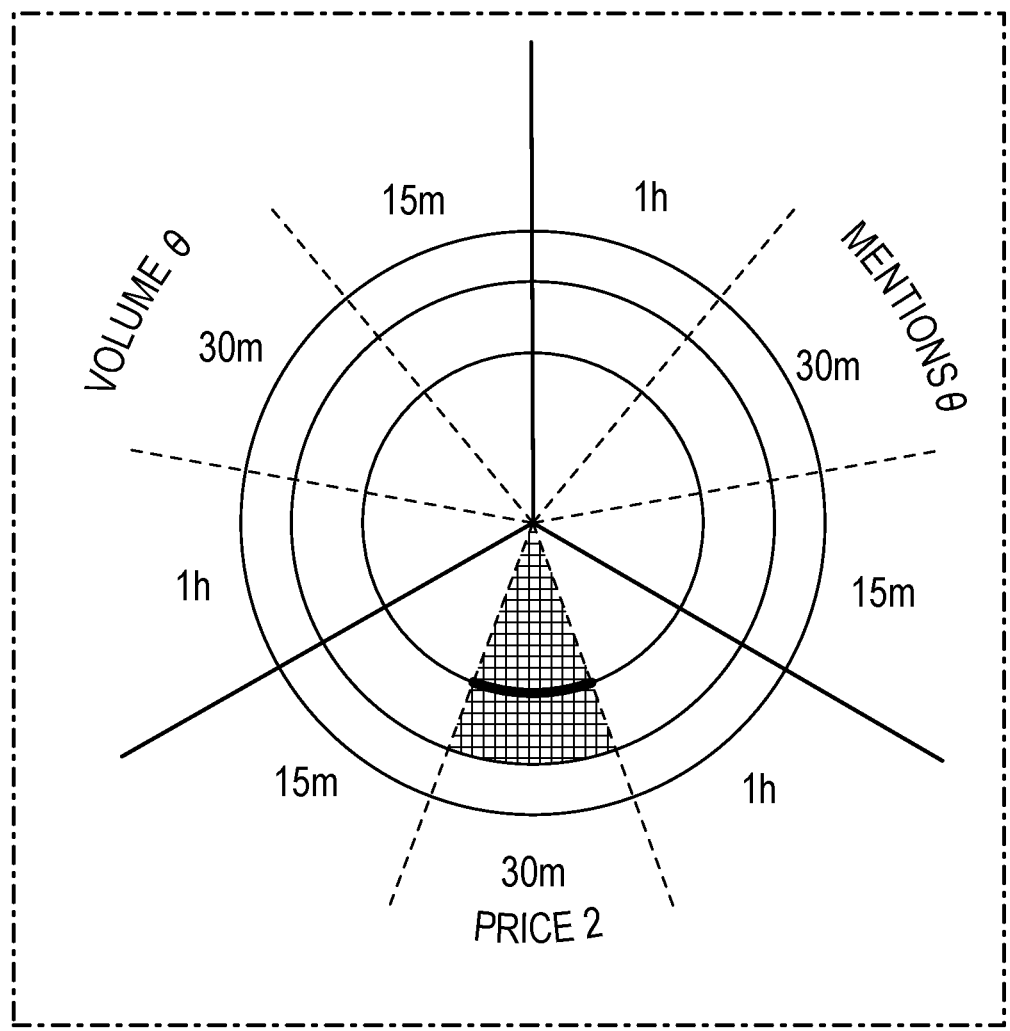
FIGS. 16-19 are examples of circular diagrams showing a historical perspective of the change in a corresponding parameter changing over time.
Figure 17:
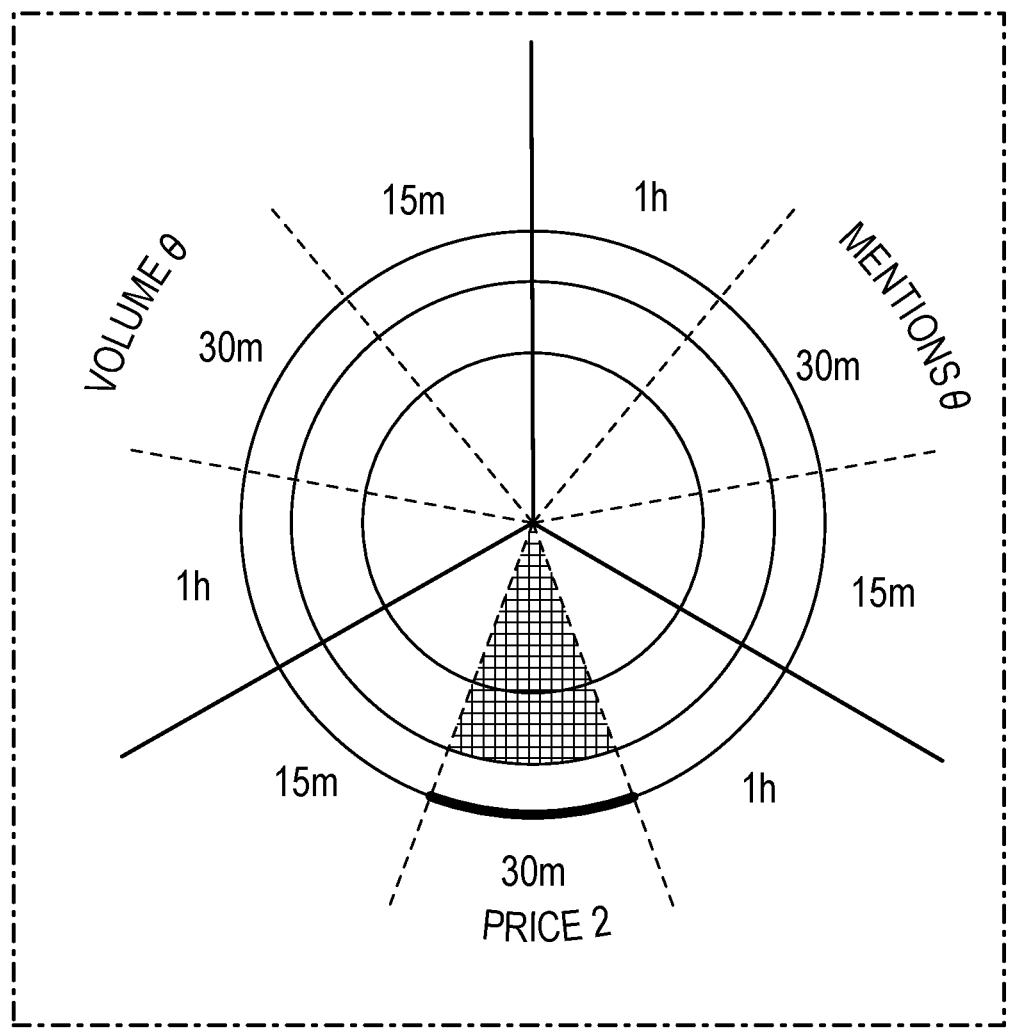
Figure 18:
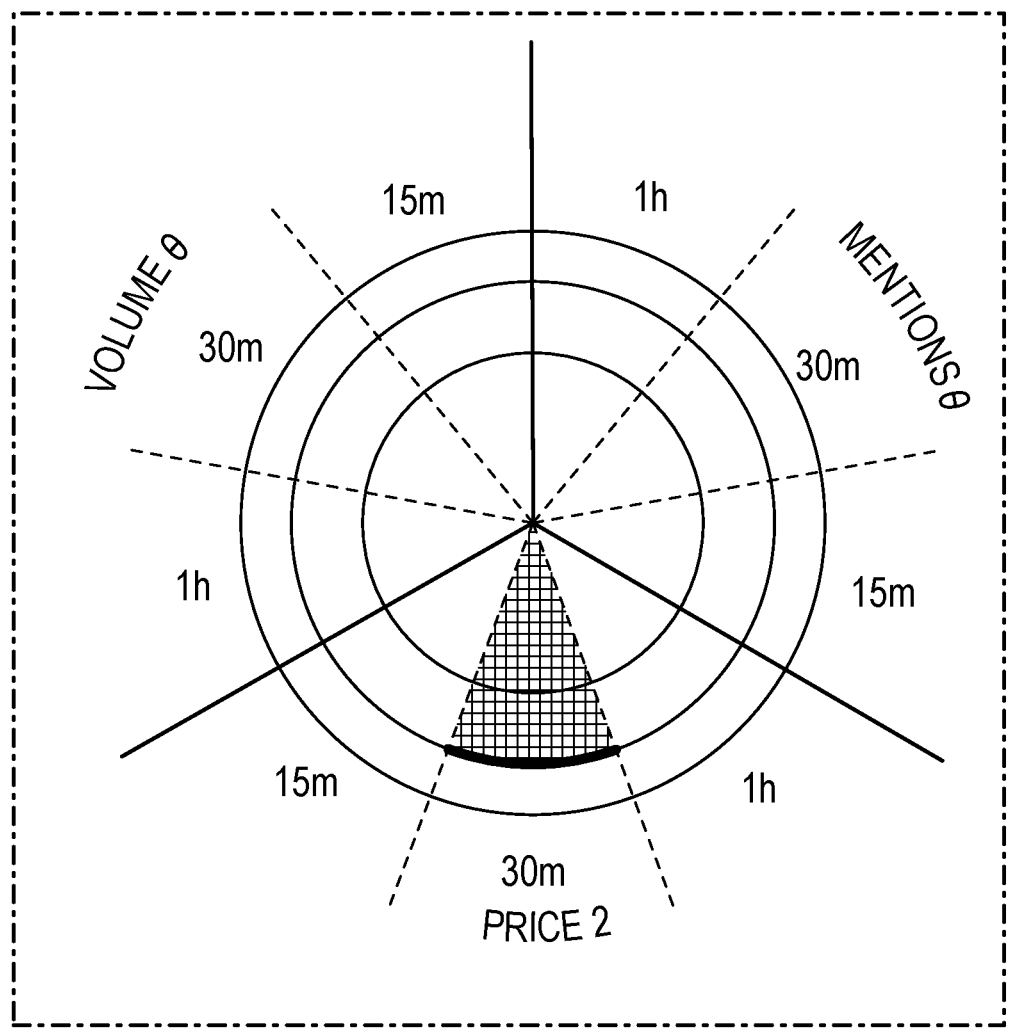
Figure 19:
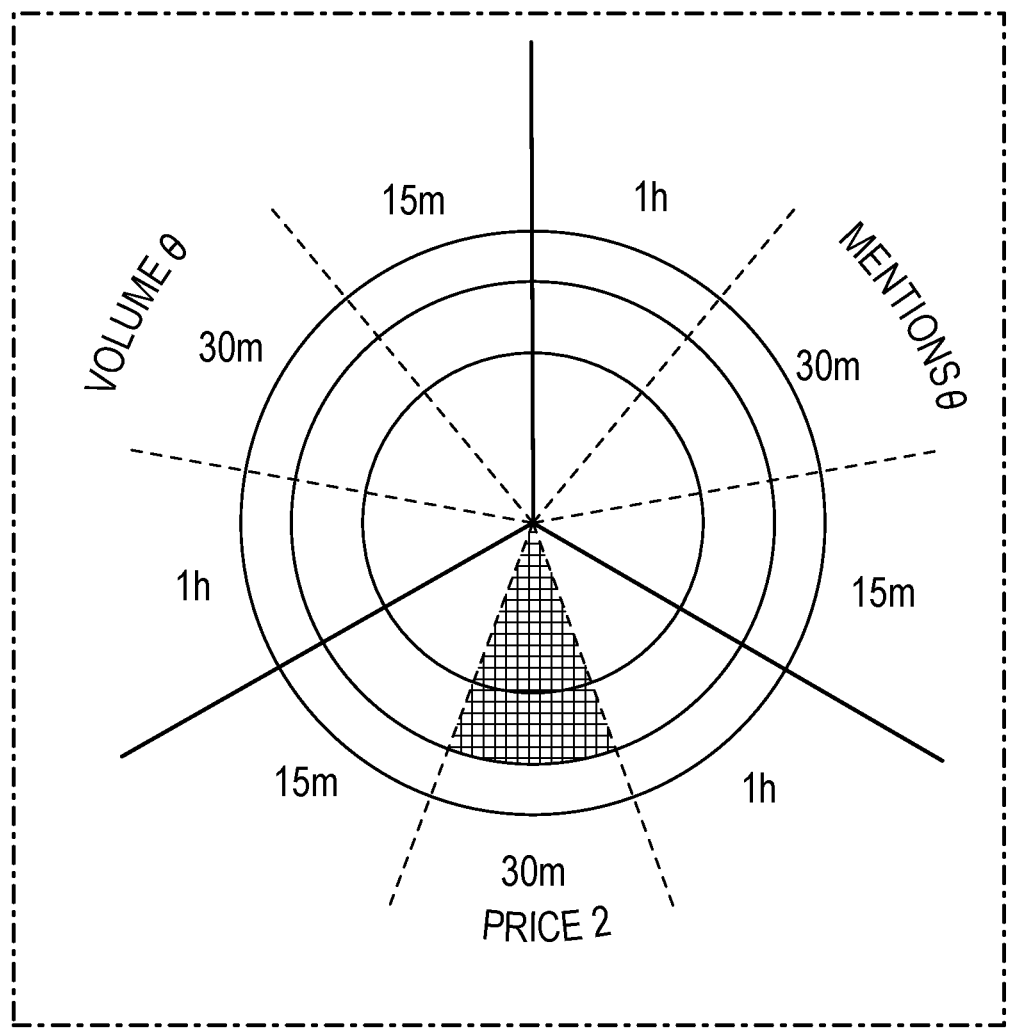
Figure 20:
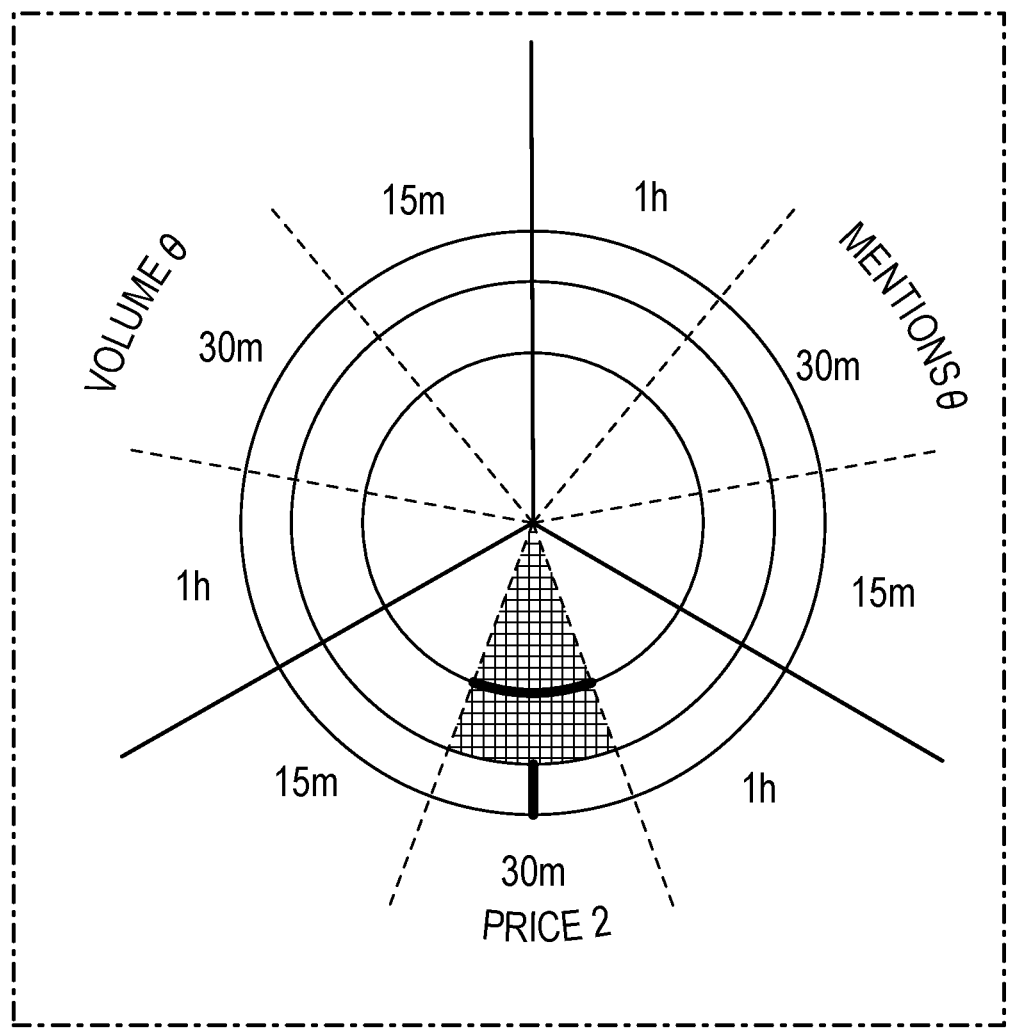
FIGS. 20-25 are examples of circular diagrams identifying various situations for the HIGH and LOW values of a selected parameter changing over time with respect to the OPEN and CLOSE points of the selected timeframe.
Figure 21:
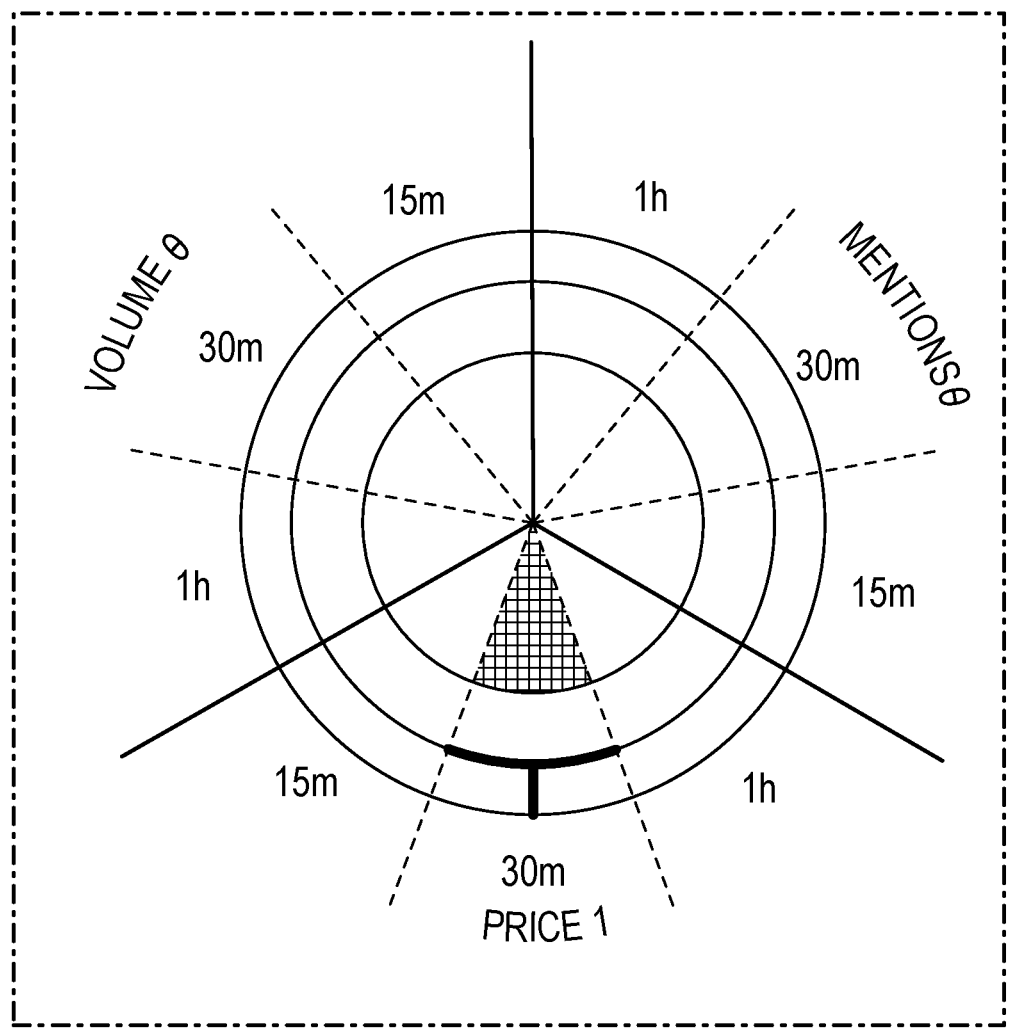
Figure 22:
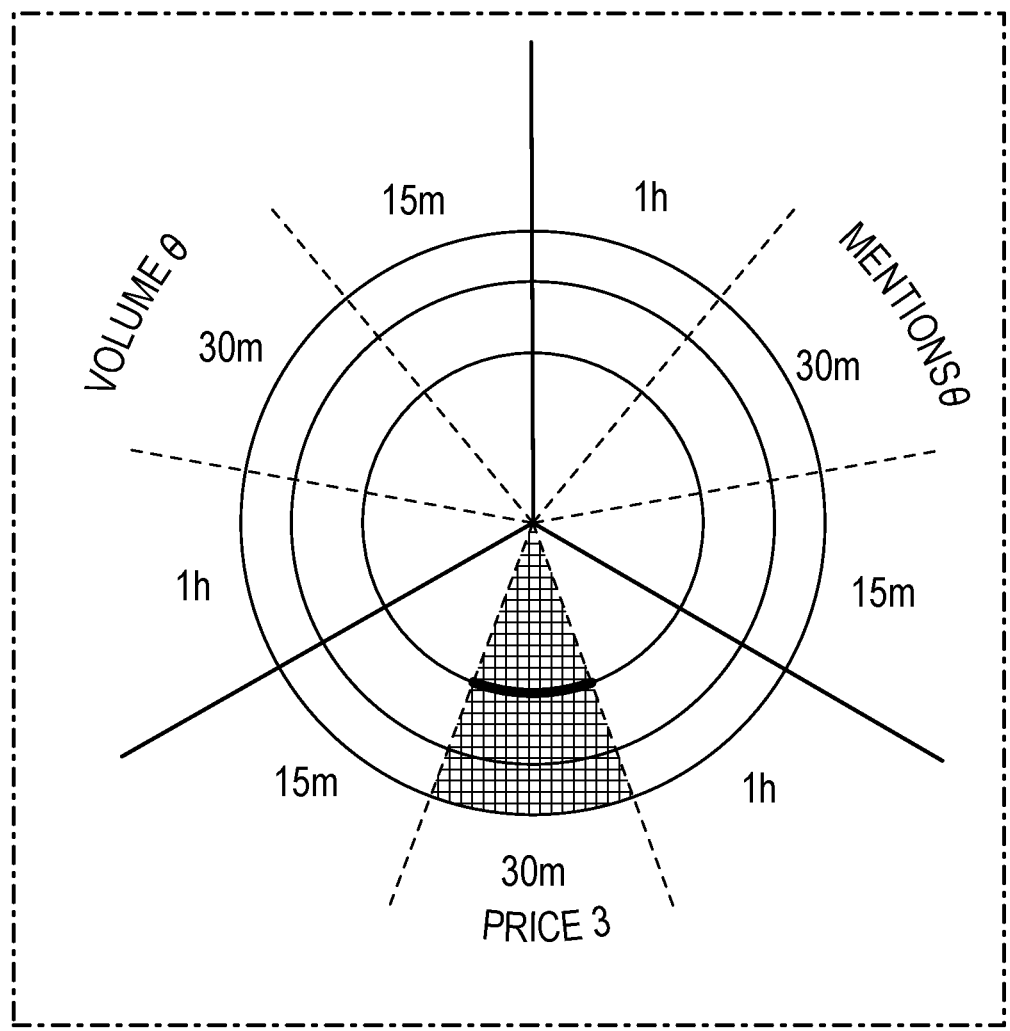

A bold portion of the line delineating one segment of the concentric circle in the circular diagram signifies the position of the $PPO_1$ relative to the crossed borders, as seen in FIGS. 16-19. The bold line reflects the OPEN value. The CLOSE value at the end of the predetermined time period is represented by the radius of the color-filled or cross-hatched segment of the circle. In general, the predetermined time period may include any desired number of steps (or ticks) of the analyzed timeframe. However, in one example, in the series of time frames 15 min-1 hr-4 hrs, it is logical to use four 15-min periods within 1 hr and four 1 hr periods within each 4 hr period. The following shows some examples of this approach:

Open<Close, which means that the number of crossed borders at the beginning or opening of the timeframe is lower than that at the closing of the timeframe, see FIG. 16;

Open>Close, which means that the number of crossed borders at the beginning or opening of the timeframe is higher than that at the closing of the timeframe, see FIG. 17;

Open=Close, which means that the number of crossed borders at the opening of the timeframe is the same as that at the closing of the timeframe, see FIG. 18;

If Open=0, there is no bold circular line at all, as seen in FIG. 19;

HIGH value is shown as the radial line connecting the maximum number of the crossed borders during the predetermined period of time and the OPEN or CLOSE value closest thereto. If the HIGH value equals the OPEN or the CLOSE value, this graphical element is omitted from the chart. One example of the situation of OPEN<CLOSE and HIGH>CLOSE is shown in FIG. 20. Another example of the situation of OPEN>CLOSE and HIGH>OPEN is shown in FIG. 21. A further example of the situation of OPEN<CLOSE and HIGH=CLOSE is shown in FIG. 22.

Figure 23:
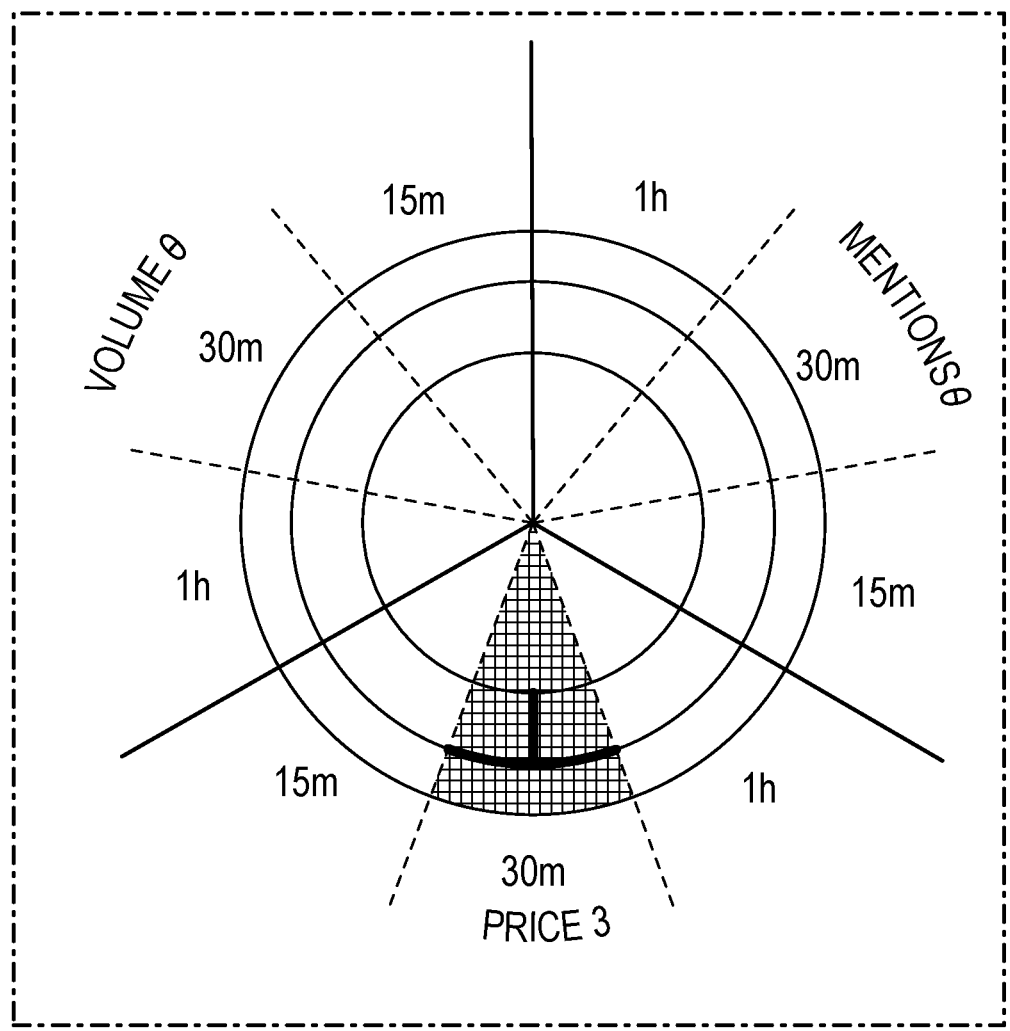
Figure 24:
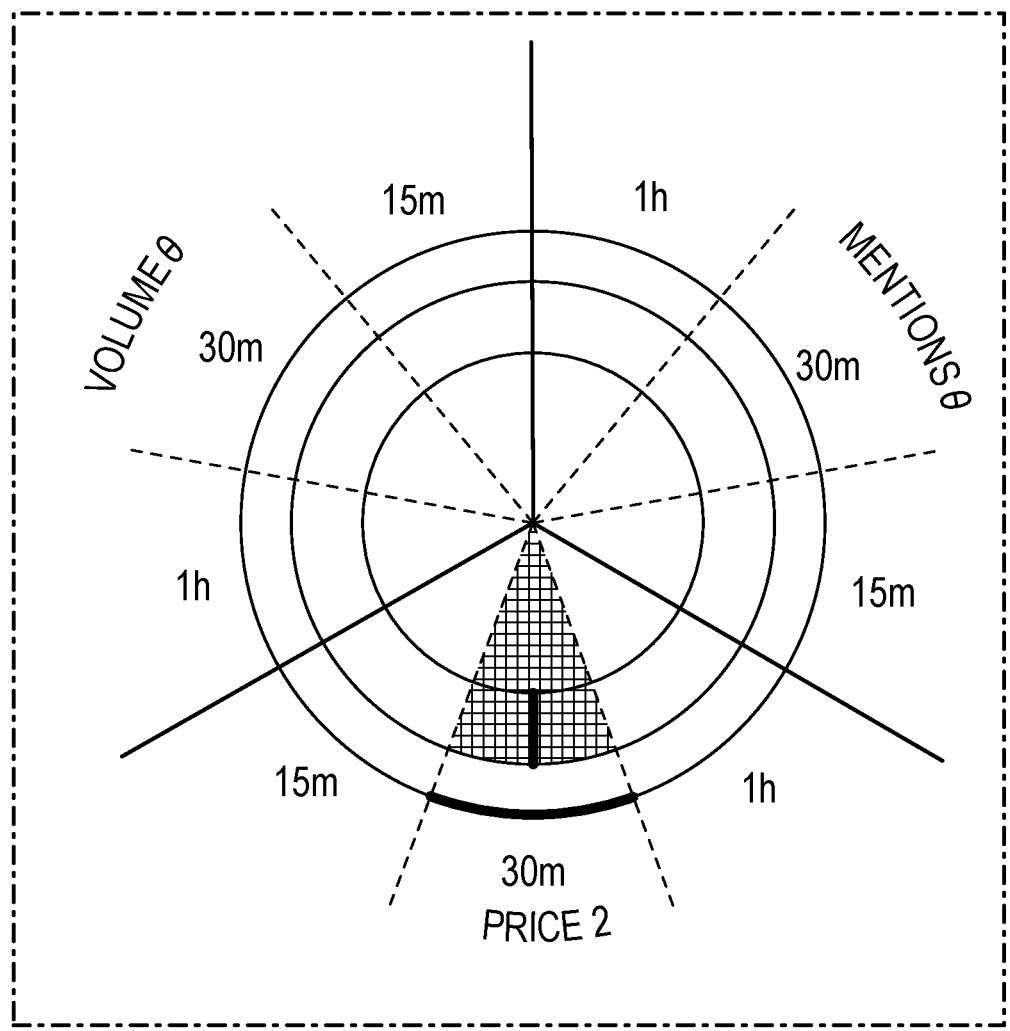
Figure 25:
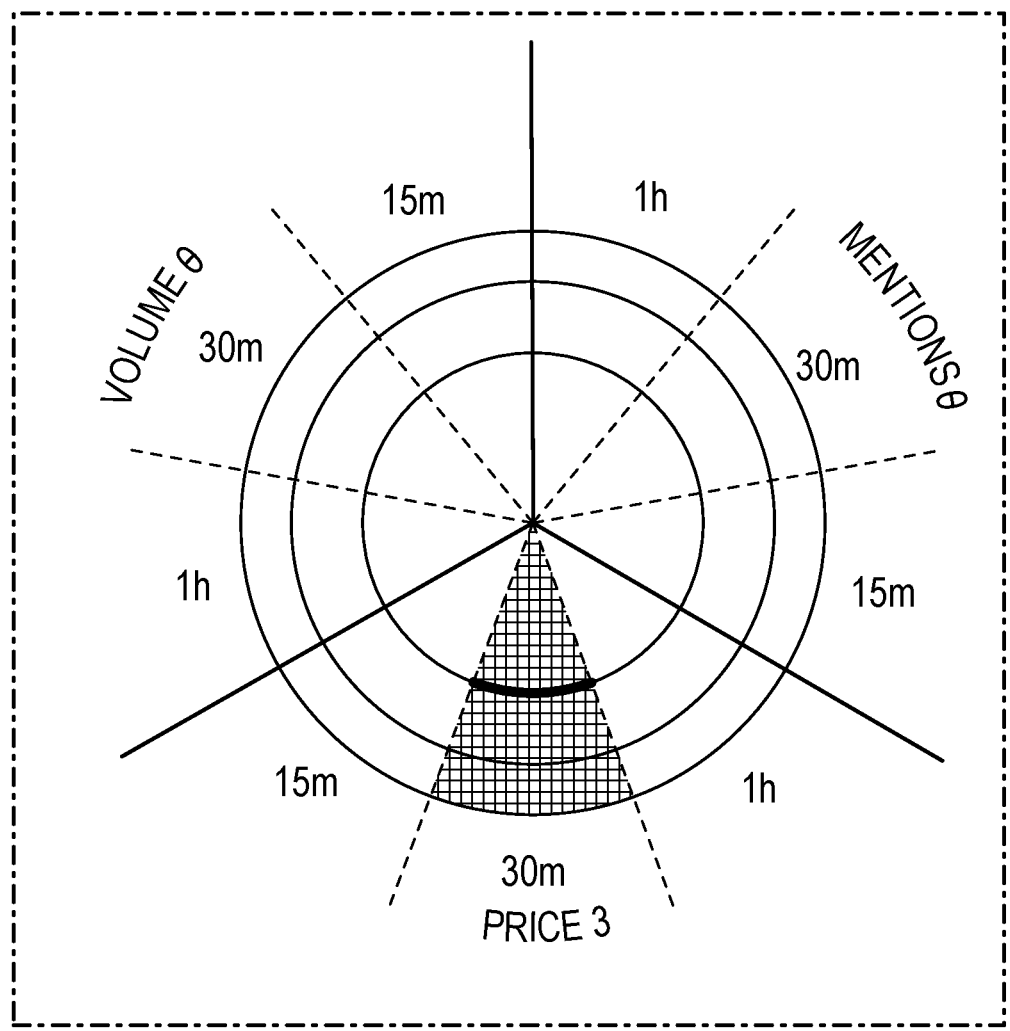

LOW value is shown as a radial line connecting the lowest number of crossed borders during the selected period of time and the OPEN or CLOSE value that is closest thereto. If the LOW value is equal to either the OPEN value or the CLOSE value, this graphical element is omitted from the circular diagram. One example of the situation of OPEN<CLOSE and LOW<OPEN is shown in FIG. 23. Another example of the situation of OPEN>CLOSE and LOW<CLOSE is shown in FIG. 24. A further example of the situation of OPEN<CLOSE and HIGH=CLOSE is shown in FIG. 25.

Figure 26:
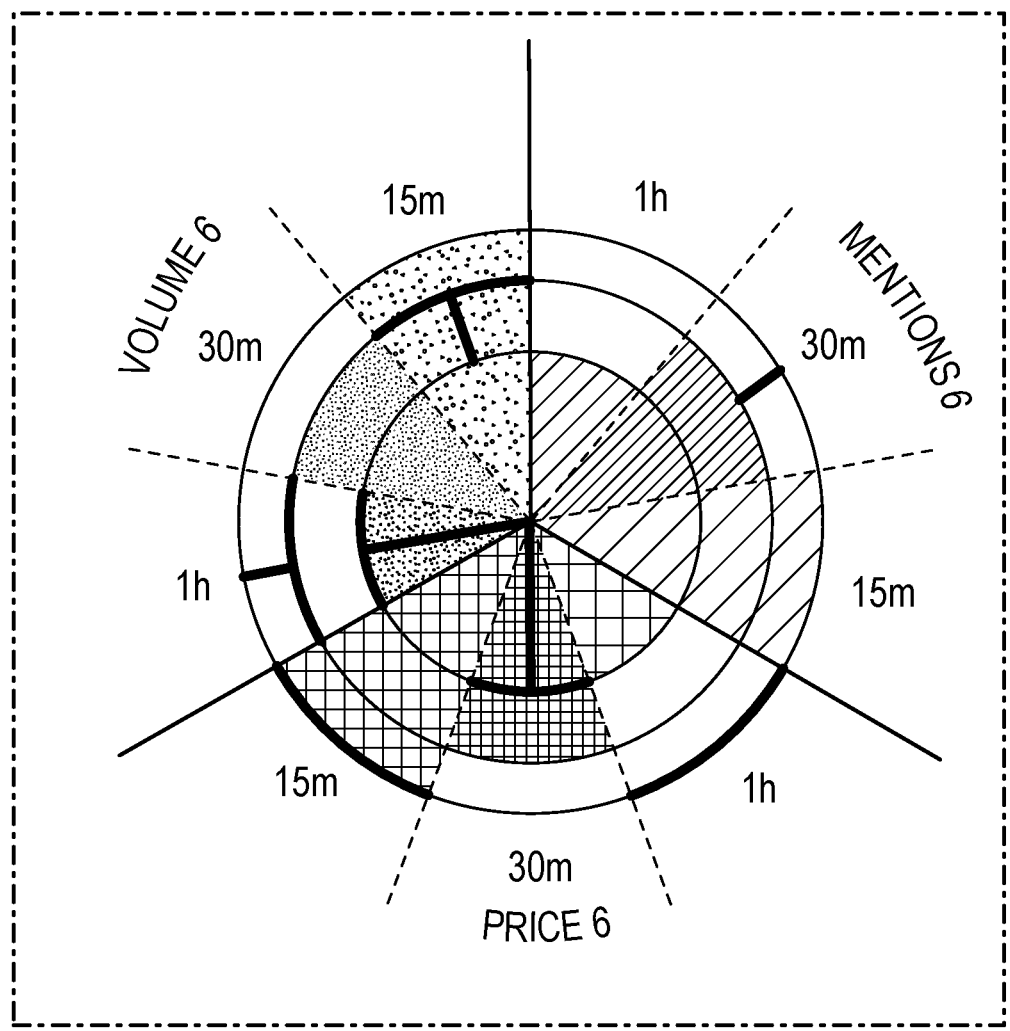
FIG. 26 is another example of a graphical object representing the integral score as well as the historical perspective of the behavior of selected parameters changing over time over several selected timeframes.

FIG. 26 shows a combined example of the circular diagram as described above.

It is contemplated that any embodiment discussed in this specification can be implemented with respect to any method of the invention, and vice versa. It will also be understood that particular embodiments described herein are shown by way of illustration and not as limitations of the invention. The principal features of this invention can be employed in various embodiments without departing from the scope of the invention. Those skilled in the art will recognize, or be able to ascertain, using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. Incorporation by reference is limited such that no subject matter is incorporated that is contrary to the explicit disclosure herein, no claims included in the documents are incorporated by reference herein, and any definitions provided in the documents are not incorporated by reference herein unless expressly included herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. In embodiments of any of the compositions and methods provided herein, "comprising" may be replaced with "consisting essentially of" or "consisting of". As used herein, the phrase "consisting essentially of" requires the specified integer(s) or steps as well as those that do not materially affect the character or function of the claimed invention. As used herein, the term "consisting" is used to indicate the presence of the recited integer (e.g., a feature, an element, a characteristic, a property, a method/process step or a limitation) or group of integers (e.g., feature(s), element(s), characteristic(s), propertie(s), method/process steps or limitation(s)) only.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12, 15, 20 or 25%.

All of the devices and/or methods disclosed and claimed herein can be made and executed without undue experimentation in light of the present disclosure. While the devices and methods of this invention have been described in terms of preferred embodiments, it will be apparent to those of skill in the art that variations may be applied to the devices and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A computerized method of selecting assets for trading consideration, the method comprising the following steps:
   a. providing a computer with a graphic user interface configured to access at least one database to obtain data characterizing available publicly traded assets at one time,
   b. selecting via the graphic interface at least two, a subset of, or all assets for further analysis from all available assets of the at least one database,
   c. selecting via the graphic interface one or more parameters changing over time for characterizing each asset selected in step (b),
   d. identifying via the graphic interface at least one time series corresponding to at least one selected timeframe for each parameter of step (c) from data characterizing assets of step (a),
   e. automatically creating for each selected time series a plurality of deviation bands using a deviation function, wherein each deviation band is defined by a respective upper channel border and a lower channel border, and wherein the deviation bands are normalized to indicate a relative and not absolute deviation of the selected parameter from its average value;
   f. automatically identifying each occurrence of crossing the upper channel border or the lower channel border of each channel by each selected time series for each selected asset,
   g. automatically calculating a sum of a total number of border crossings for each selected parameter for each selected asset,
   h. automatically calculating an integral score for each selected asset reflecting the sum of the total number of border crossings in step (g), and
   i. graphically presenting via the graphic user interface the results of calculations in step (h) as at least two graphical comparison diagrams representing the integral score for each respective selected asset thereby facilitating a comparison between selected assets in order to identify assets with highest fluctuations from their normal values, wherein a higher value of the integral score indicates a higher deviation of the selected time series and to be used as a trading consideration, wherein each comparison diagram is a circular diagram representing the integral score and its components, each circular diagram includes a plurality of sectors, each sector representing the total number of border crossings for each corresponding parameter of step (g).

2. The computerized method of selecting assets for trading consideration, as in claim 1, wherein in step (a), the computer is used to access a plurality of databases containing financial data and social media mentions data for a plurality of assets.

3. The computerized method of selecting assets for trading consideration, as in claim 1, wherein in step (a), assets are selected using their respective tickers.

4. The computerized method of selecting assets for trading consideration, as in claim 1, wherein in step (c), the parameters changing over time for characterizing each asset comprise price, trading volume, and social media mentions.

5. The computerized method of selecting assets for trading consideration, as in claim 1, wherein in step (e), the deviation function is a Percentage Oscillator function.

6. The computerized method of selecting assets for trading consideration, as in claim 4, wherein in step (e), the deviation bands are Bollinger bands.

7. The computerized method of selecting assets for trading consideration, as in claim 1, wherein each sector further comprises a plurality of subsectors, each subsector representing one respective timeframe of step (c) characterizing the respective parameter of step (c).

8. The computerized method of selecting assets for trading consideration, as in claim 1, further comprising a step (j) of repeating steps (a) through (i) at least once or on a predetermined periodic basis to keep current with changing market conditions.

9. The computerized method of selecting assets for trading consideration, as in claim 1, wherein steps (c) through (i) are automatically repeated with a periodicity of at least 15 minutes and at most 90 minutes for assets selected in step (b) to keep current with changing market conditions.

10. The computerized method of selecting assets for trading consideration, as in claim 9, wherein step (b) comprises selecting at least 100 assets for further analysis in steps (c) through (i).

11. The computerized method of selecting assets for trading consideration, as in claim 9, wherein step (b) comprises selecting at least 1000 assets for further analysis in steps (c) through (i).

12. The computerized method of selecting assets for trading consideration, as in claim 1, wherein step (a) is done in real-time or with less than one minute delay as compared to market conditions and steps (b) through (i) are completed within less than 1 minute after completion of step (a) to keep current with changing market conditions.

13. A computerized method of selecting assets for trading consideration, the method comprising the following steps:
- a. providing a computer with a graphic user interface configured to access at least one database to obtain data characterizing available publicly traded assets at one time,
- b. selecting via the graphic interface at least two, a subset of, or all assets for further analysis from all available assets of the at least one database,
- c. selecting via the graphic interface one or more parameters changing over time for characterizing each asset selected in step (b),
- d. identifying via the graphic interface at least one time series corresponding to at least one selected timeframe for each parameter of step (c) from data characterizing assets of step (a),
- e. automatically creating for each selected time series a plurality of deviation bands using a deviation function, wherein each deviation band is defined by a respective upper channel border and a lower channel border, and wherein the deviation bands are normalized to indicate a relative and not absolute deviation of the selected parameter from its average value;
- f. automatically identifying each occurrence of crossing the upper channel border or the lower channel border of each channel by each selected time series for each selected asset,
- g. automatically calculating a sum of a total number of border crossings for each selected parameter for each selected asset,
- h. automatically calculating an integral score for each selected asset reflecting the sum of the total number of border crossings in step (g), and
- i. graphically presenting via the graphic user interface the results of calculations in step (h) as at least two graphical comparison diagrams representing the integral score for each respective selected asset thereby facilitating a comparison between selected assets in order to identify assets with highest fluctuations from their normal values, wherein a higher value of the integral score indicates a higher deviation of the selected time series and to be used as a trading consideration, wherein each comparison diagram is a circular diagram representing the integral score and its components, each circular diagram includes a plurality of sectors, each sector representing the total number of border crossings for each corresponding parameter of step (g).

* * * * *